(12) United States Patent
Takatsu et al.

(10) Patent No.: US 10,122,211 B2
(45) Date of Patent: Nov. 6, 2018

(54) WIRELESS POWER TRANSFER SYSTEM

(71) Applicant: IHI CORPORATION, Tokyo (JP)

(72) Inventors: Yuji Takatsu, Tokyo (JP); Susumu Tokura, Tokyo (JP); Akio Ueda, Tokyo (JP); Sho Hashizume, Tokyo (JP); Kei Akune, Tokyo (JP); Tooru Hayashi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 10 days.

(21) Appl. No.: 15/270,405

(22) Filed: Sep. 20, 2016

(65) Prior Publication Data

US 2017/0012474 A1  Jan. 12, 2017

Related U.S. Application Data

(63) Continuation of application No. PCT/JP2015/058609, filed on Mar. 20, 2015.

(30) Foreign Application Priority Data

Mar. 21, 2014 (JP) .................................. 2014-059341

(51) Int. Cl.
    *H02J 50/10* (2016.01)
    *H02J 50/12* (2016.01)
    (Continued)

(52) U.S. Cl.
    CPC ............. *H02J 50/10* (2016.02); *B60L 11/182* (2013.01); *B60L 11/1829* (2013.01);
    (Continued)

(58) Field of Classification Search
    CPC ....................................................... H02J 50/10
    (Continued)

(56) References Cited

U.S. PATENT DOCUMENTS 8,035,255 B2  10/2011  Kurs et al.
8,106,539 B2   1/2012  Schatz et al.
(Continued)

FOREIGN PATENT DOCUMENTS

CN      101304178 A    11/2008
EP        0788212 A2    8/1997
(Continued)

*Primary Examiner* — Rexford Barnie
*Assistant Examiner* — Joseph Inge
(74) *Attorney, Agent, or Firm* — Volpe and Koenig, P.C.

(57) ABSTRACT

A wireless power transfer system includes: a station that a vehicle is capable of entering and leaving; and a bottom part detection sensor having a detection unit capable of detecting an object that enters a detection range, provided at the station, and that outputs a bottom part detection signal corresponding to a portion, which enters the detection range, of a bottom part of the vehicle. The wireless power transfer system executes: a detection signal output step in which the bottom part detection sensor outputs a time-series bottom part detection signal when the vehicle moves in the station at a predetermined speed that is a prescribed speed; and a coil position information extraction step of extracting, from the time-series bottom part detection signal, coil position information that is information about a position of an electric power receiving coil in the vehicle.

15 Claims, 13 Drawing Sheets

(51) Int. Cl.
*H02J 5/00* (2016.01)
*H02J 50/90* (2016.01)
*B60L 11/18* (2006.01)
*H02J 7/02* (2016.01)

(52) U.S. Cl.
CPC ........... *B60L 11/1835* (2013.01); *H02J 5/005* (2013.01); *H02J 7/025* (2013.01); *H02J 50/12* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC .......................................................... 307/104
See application file for complete search history.

(56) References Cited

U.S. PATENT DOCUMENTS 9,796,280 B2 * 10/2017 McCool ................ B60L 11/182
2008/0164839 A1 7/2008 Kato et al.
2011/0063213 A1 3/2011 Kang et al.
2013/0249299 A1 9/2013 Shijo et al.
2015/0015419 A1 * 1/2015 Halker ................ B60L 11/1827
340/901

FOREIGN PATENT DOCUMENTS

| | | |
|---|---|---|
| EP | 2330262 A2 | 6/2011 |
| JP | 2011-036107 A | 2/2011 |
| JP | 2011-060260 A | 3/2011 |
| JP | 2011-097814 A | 5/2011 |
| JP | 2011-217452 A | 10/2011 |
| JP | 2012-010551 A | 1/2012 |
| JP | 2013-055803 A | 3/2013 |
| JP | 2013-201867 A | 10/2013 |
| WO | 2010/122598 A1 | 10/2010 |
| WO | 2013/003527 A1 | 1/2013 |
| WO | 2013/142866 A1 | 9/2013 |
| WO | 2014/029414 A1 | 2/2014 |

* cited by examiner

VIEWED FROM A-A ARROW

WIRELESS POWER TRANSFER SYSTEM

CROSS-REFERENCE TO RELATED APPLICATIONS

This application is a continuation application of International Application No. PCT/JP2015/058609, filed Mar. 20, 2015, which claims priority to Japanese Patent Application No. 2014-059341 filed Mar. 21, 2014. The contents of these applications are incorporated herein by reference in their entirety.

TECHNICAL FIELD

The present disclosure relates to a wireless power transfer system that supplies electric power to a vehicle capable of receiving electric power supply.

BACKGROUND ART

In recent years, vehicles driven by electric power have been used.

This leads to a need for supplying electric power to a vehicle.

For example, electric power is fed to a parked vehicle by an electric power supplying apparatus.

The electric power supplying apparatus is capable of supplying electric power to a vehicle in a wireless manner.

For example, such an idea has been studied that a vehicle has a wireless type electric power receiving coil on a bottom part thereof, and an electric power supplying coil is provided below the vehicle to supply electric power to the vehicle.

FIGS. 13A and 13B are diagrams of a wireless power transfer system.

The concept illustrated in FIGS. 13A and 13B has been disclosed in U.S. Pat. No. 8,035,255.

When a wireless type power transfer is employed, it is desired that the electric power is supplied with a small energy loss from the electric power supplying coil to the electric power receiving coil.

When supplying electric power from the electric power supplying coil to the electric power receiving coil in a wireless manner, it is also desired that usage is easy.

In the wireless power transfer system, electric power is fed in a wireless manner from the electric power supplying coil to the electric power receiving coil via a magnetic field formed in a space between the electric power supplying coil and the electric power receiving coil.

CITATION LIST

Patent Literature

Patent Literature 1: Japanese Unexamined Patent Publication No. 2011-60260
Patent Literature 2: Japanese Unexamined Patent Publication No. 2011-97814
Patent Literature 3: U.S. Pat. No. 8,035,255
Patent Literature 4: U.S. Pat. No. 8,106,539

SUMMARY

Technical Problem

There is a reasonable restriction on a distance and a misalignment between an electric power supplying coil and an electric power receiving coil. An attempt to supply electric power while exceeding the restrictions on a distance and a misalignment leads to failure, that is, a large energy loss.

In order to reduce the energy loss, alignment of the electric power receiving coil and the electric power supplying coil is required. For the alignment, a position of the electric power receiving coil needs to be specified. In particular, in a case where the electric power receiving coil is incorporated in a vehicle, a position of the electric power receiving coil provided in the vehicle is different depending on a vehicle type. Therefore, in order to ensure the alignment with respect to any kind of vehicles and realize efficient electric power supply, the position of the electric power receiving coil, an installation position of which is different depending on the vehicle type, needs to be figured out.

The present disclosure describes an electric power supplying system to an object capable of specifying the position of the electric power receiving coil with respect to the vehicle.

Solution to Problem

In order to achieve the above-mentioned purpose, an aspect of the present disclosure is a wireless power transfer system that supplies electric power to a vehicle in which an electric power receiving coil capable of receiving wireless power transfer is incorporated, the wireless power transfer system including: a station that the vehicle is capable of entering and leaving; and a bottom part detection sensor having a detection unit capable of detecting an object that enters a detection range, provided at the station, and that outputs a bottom part detection signal in accordance with a portion, which enters the detection range, of a bottom part of the vehicle, wherein the wireless power transfer system executes: a detection signal output step of outputting, by the bottom part detection sensor, a time-series bottom part detection signal when the vehicle moves in the station at a predetermined speed that is a prescribed speed; and a coil position information extraction step of extracting, from the time-series bottom part detection signal, coil position information that is information related to a position of the electric power receiving coil in the vehicle.

Owing to the above-mentioned configuration, the vehicle can enter and leave the station. The bottom part detection sensor has the detection unit capable of detecting the object that enters the detection range, is provided at the station, and outputs the bottom part detection signal in accordance with the portion, which enters the detection range, of the bottom part of the vehicle. The detection signal output step outputs, by the bottom part detection sensor, the time-series bottom part detection signal when the vehicle moves in the station at the predetermined speed that is the prescribed speed. The coil position information extraction step extracts, from the time-series bottom part detection signal, the coil position information that is the information related to the position of the electric power receiving coil in the vehicle.

As a result, the position of the electric power receiving coil with respect to the vehicle can be specified. In order to cause an electric power supplying coil and the electric power receiving coil to face each other, position information of the electric power receiving coil can be used, whereby feasibility of improvement in electric power supply efficiency is increased.

Hereinafter, a wireless power transfer system according to an embodiment of the present disclosure will be described.

The present disclosure includes any of embodiments described below or an aspect that combines two or more of these embodiments.

The wireless power transfer system according to the embodiment of the present disclosure is configured such that the bottom part detection sensor is an eddy current type distance sensor that outputs a bottom part detection signal that depends on a separation distance between the portion which enters the detection range and the detection unit, and on a magnetic property of the portion which enters the detection range, and the coil position information extraction step extracts, from the time-series bottom part detection signal, the coil position information based on a portion inside a contour of the bottom part of the vehicle in which detection sensitivity that is an amount of change in the bottom part detection signal per unit time significantly changes.

Owing to the configuration of the embodiment of the present disclosure, the bottom part detection sensor is the eddy current type distance sensor that outputs the bottom part detection signal that depends on the separation distance between the portion which enters the detection range and the detection unit, and on the magnetic property of the portion which enters the detection range. The coil position information extraction step extracts, from the time-series bottom part detection signal, the coil position information based on the portion inside the contour of the bottom part of the vehicle in which the detection sensitivity that is the amount of change in the bottom part detection signal per unit time significantly changes.

As a result, the position of the electric power receiving coil with respect to the vehicle can be specified.

The wireless power transfer system according to the embodiment of the present disclosure is configured such that the bottom part detection sensor is a laser type distance sensor that outputs a bottom part detection signal that depends on a separation distance between the portion which enters the detection range and the detection unit, and the coil position information extraction step extracts, from the time-series bottom part detection signal, the coil position information based on a portion inside a contour of the bottom part of the vehicle that coincides with a set contour that is a contour set in advance.

Owing to the configuration of the embodiment of the present disclosure, the bottom part detection sensor is the laser type distance sensor that outputs the bottom part detection signal that depends on the separation distance between the portion which enters the detection range and the detection unit. The coil position information extraction step extracts, from the time-series bottom part detection signal, the coil position information based on the portion inside the contour of the bottom part of the vehicle that coincides with the set contour that is the contour set in advance.

As a result, the position of the electric power receiving coil with respect to the vehicle can be specified.

The wireless power transfer system according to the embodiment of the present disclosure is configured such that the bottom part detection sensor is a laser type distance sensor that outputs a bottom part detection signal that depends on a separation distance between the portion which enters the detection range and the detection unit, and the coil position information extraction step extracts, from the time-series bottom part detection signal, the coil position information based on a portion inside a contour of the bottom part of the vehicle in which the bottom part detection signal does not change and is constant.

Owing to the configuration of the embodiment of the present disclosure, the bottom part detection sensor is the laser type distance sensor that outputs the bottom part detection signal that depends on the separation distance between the portion which enters the detection range and the detection unit. The coil position information extraction step extracts, from the time-series bottom part detection signal, the coil position information based on the portion inside the contour of the bottom part of the vehicle in which the bottom part detection signal does not change and is constant.

As a result, the position of the electric power receiving coil with respect to the vehicle can be specified.

The wireless power transfer system according to the embodiment of the present disclosure includes a vehicle moving mechanism provided at the station and capable of supporting the vehicle and moving the vehicle at a constant speed, wherein the detection signal output step is a step of outputting, by the bottom part detection sensor, the time-series bottom part detection signal when the vehicle moving mechanism moves the vehicle in the station at the constant speed.

Owing to the configuration of the embodiment of the present disclosure, the vehicle moving mechanism is provided at the station and capable of supporting the vehicle and moving the vehicle at the constant speed. The detection signal output step is the step of outputting, by the bottom part detection sensor, the time-series bottom part detection signal when the vehicle moving mechanism moves the vehicle in the station at the constant speed.

As a result, the position of the electric power receiving coil with respect to the vehicle can be specified based on the coil position information extracted from the stable time-series bottom part detection signal.

The wireless power transfer system according to the embodiment of the present disclosure includes a vehicle body detection sensor that detects a vehicle body of the vehicle and outputs a vehicle body detection signal, and includes a predetermined speed estimation step of estimating, when the vehicle moves in the station, the predetermined speed of the vehicle based on a time-series vehicle body detection signal and a length of the vehicle output from the vehicle body detection sensor, wherein the coil position information extraction step extracts, from the time-series bottom part detection signal and the predetermined speed estimated in the predetermined speed estimation step, the coil position information that is the information related to the position of the electric power receiving coil in the vehicle.

Owing to the configuration of the embodiment of the present disclosure, the vehicle body detection sensor detects the vehicle body of the vehicle and outputs the vehicle body detection signal. The predetermined speed estimation step estimates, when the vehicle moves in the station, the predetermined speed of the vehicle based on the time-series vehicle body detection signal and the length of the vehicle output from the vehicle body detection sensor. The coil position information extraction step extracts, from the time-series bottom part detection signal and the predetermined speed estimated in the predetermined speed estimation step, the coil position information that is the information related to the position of the electric power receiving coil in the vehicle.

As a result, the position of the electric power receiving coil with respect to the vehicle can be specified.

In order to achieve the above-mentioned purpose, an aspect of the present disclosure is a wireless power transfer system that supplies electric power to a vehicle in which an electric power receiving coil capable of receiving wireless power transfer is incorporated, the wireless power transfer system including: a station that the vehicle is capable of entering and leaving; and a bottom part photographing apparatus provided at the station and capable of photographing a bottom part of the vehicle, wherein the wireless power transfer system executes: a bottom part photographing step of photographing, by the bottom part photographing apparatus, the bottom part of the vehicle when the vehicle is located at the station; and a coil position information extraction step of extracting, from a video of the bottom part of the vehicle photographed by the bottom part photographing apparatus, coil position information that is information related to a position of the electric power receiving coil based on a position, inside a contour of the bottom part of the vehicle, of what coincides with a set contour that is a contour set in advance.

Owing to the above-mentioned configuration, the vehicle can enter and leave the station. The bottom part photographing apparatus is provided at the station and capable of photographing the bottom part of the vehicle. The bottom part photographing step photographs, by the bottom part photographing apparatus, the bottom part of the vehicle when the vehicle is located at the station. The coil position information extraction step extracts, from the video of the bottom part of the vehicle photographed by the bottom part photographing apparatus, the coil position information that is the information related to the position of the electric power receiving coil based on the position, inside the contour of the bottom part of the vehicle, of what coincides with the set contour that is the contour set in advance.

As a result, the position of the electric power receiving coil with respect to the vehicle can be specified.

In order to achieve the above-mentioned purpose, an aspect of the present disclosure is a wireless power transfer system that supplies electric power to a vehicle in which an electric power receiving coil capable of receiving wireless power transfer is incorporated, a bottom part of the vehicle being provided with a mark at a position corresponding to a position of the electric power receiving coil, the wireless power transfer system including: a station that the vehicle is capable of entering and leaving; and a bottom part photographing apparatus provided at the station and capable of photographing the bottom part of the vehicle, wherein the wireless power transfer system executes: a bottom part photographing step of photographing, by the bottom part photographing apparatus, the bottom part of the vehicle when the vehicle is located at the station; and a coil position information extraction step of extracting, from a video of the bottom part of the vehicle photographed by the bottom part photographing apparatus, coil position information that is information related to the position of the electric power receiving coil in the vehicle based on a position, inside a contour of the bottom part of the vehicle, of what coincides with a set mark that is a mark set in advance.

Owing to the above-mentioned configuration, the bottom part of the vehicle is provided with the mark at the position corresponding to the position of the electric power receiving coil. The vehicle can enter and leave the station. The bottom part photographing apparatus is provided at the station and capable of photographing the bottom part of the vehicle. The bottom part photographing step photographs, by the bottom part photographing apparatus, the bottom part of the vehicle when the vehicle is located at the station. The coil position information extraction step extracts, from the video of the bottom part of the vehicle photographed by the bottom part photographing apparatus, the coil position information that is the information related to the position of the electric power receiving coil in the vehicle based on the position, inside the contour of the bottom part of the vehicle, of what coincides with the set mark that is the mark set in advance.

As a result, the position of the electric power receiving coil with respect to the vehicle can be specified.

Hereinafter, a wireless power transfer system according to an embodiment of the present disclosure will be described. The present disclosure includes any of embodiments described below or an aspect that combines two or more of these embodiments.

The wireless power transfer system according to the embodiment of the present disclosure includes a photographing apparatus provided at the station and capable of photographing the vehicle, wherein the wireless power transfer system executes: a vehicle photographing step of photographing, by the photographing apparatus, the vehicle when the vehicle is located at the station; a vehicle type specifying step of specifying a vehicle type of the vehicle from a video photographed by the photographing apparatus; and a vehicle type coil position information recording step of correlating the vehicle type of the vehicle with the coil position information and recording, in a database, the vehicle type of the vehicle and the coil position information.

Owing to the configuration of the embodiment of the present disclosure, the photographing apparatus is provided at the station and capable of photographing the vehicle. The vehicle photographing step photographs, by the photographing apparatus, the vehicle when the vehicle is located at the station. The vehicle type specifying step specifies the vehicle type of the vehicle from the video photographed by the photographing apparatus. The vehicle type coil position information recording step correlates the vehicle type of the vehicle with the coil position information and records, in the database, the vehicle type of the vehicle and the coil position information.

As a result, the position of the electric power receiving coil with respect to each vehicle type can be specified based on the coil position information obtained from the vehicle type of the vehicle.

In order to achieve the above-mentioned purpose, an aspect of the present disclosure is a wireless power transfer system that supplies electric power to a vehicle in which an electric power receiving coil capable of receiving wireless power transfer is incorporated, the wireless power transfer system including: a station that the vehicle is capable of entering and leaving; and a photographing apparatus provided at the station and capable of photographing the vehicle, wherein the wireless power transfer system executes: a preparation step of preparing a database in which a plurality of vehicle types and a plurality of items of coil position information that is information related to a position of the electric power receiving coil in the vehicle are correlated with each other and recorded in advance; a vehicle photographing step of photographing, by the photographing apparatus, the vehicle when the vehicle is located at the station; a vehicle type specifying step of specifying a vehicle type of the vehicle from a video photographed by the photographing apparatus; and a coil position information obtaining step of obtaining, from the database, the coil position information correlated with the vehicle type of the vehicle specified in the vehicle type specifying step.

Owing to the above-mentioned configuration, the vehicle can enter and leave the station. The photographing apparatus is provided at the station and capable of photographing the vehicle. The preparation step prepares the database in which the plurality of vehicle types and the plurality of items of coil position information that is the information related to the position of the electric power receiving coil in the vehicle are correlated with each other and recorded in advance. The vehicle photographing step photographs, by the photographing apparatus, the vehicle when the vehicle is located at the station. The vehicle type specifying step specifies the vehicle type of the vehicle from the video photographed by the photographing apparatus. The coil position information obtaining step obtains, from the database, the coil position information correlated with the vehicle type of the vehicle specified in the vehicle type specifying step.

As a result, the position of the electric power receiving coil with respect to the vehicle can be specified.

In order to achieve the above-mentioned purpose, an aspect of the present disclosure is a wireless power transfer system that supplies electric power to a vehicle in which an electric power receiving coil capable of receiving wireless power transfer is incorporated, the wireless power transfer system including: a station that the vehicle is capable of entering and leaving; and a plurality of bottom part detection sensors having a detection unit capable of detecting an object that enters a detection range, and provided at the station and arranged to be spaced apart from each other, each of the plurality of bottom part detection sensors being configured to output a bottom part detection signal in accordance with a portion, which enters the detection range, of a bottom part of the vehicle, wherein the wireless power transfer system executes: a detection signal output step of outputting, by the plurality of bottom part detection sensors, a respective plurality of the bottom part detection signals when the vehicle is located at the station; and a coil position information extraction step of extracting, from the plurality of bottom part detection signals, coil position information that is information related to a position of the electric power receiving coil in the vehicle.

Owing to the above-mentioned configuration, the vehicle can enter and leave the station. The plurality of bottom part detection sensors has the detection unit capable of detecting the object that enters the detection range, and is provided at the station and arranged to be spaced apart from each other. Each of the plurality of bottom part detection sensors outputs the bottom part detection signal in accordance with the portion, which enters the detection range, of the bottom part of the vehicle. The detection signal output step is a step of outputting, by the plurality of bottom part detection sensors, the respective plurality of bottom part detection signals when the vehicle is located at the station. The coil position information extraction step extracts, from the plurality of bottom part detection signals, the coil position information that is the information related to the position of the electric power receiving coil in the vehicle.

As a result, the position of the electric power receiving coil with respect to the vehicle can be specified.

Hereinafter, a wireless power transfer system according to an embodiment of the present disclosure will be described. The present disclosure includes any of embodiments described below or an aspect that combines two or more of these embodiments.

The wireless power transfer system according to the embodiment of the present disclosure is configured such that the bottom part detection sensor is an eddy current type distance sensor that outputs a bottom part detection signal that depends on a separation distance between the portion which enters the detection range and the detection unit, and on a magnetic property of the portion which enters the detection range, and the coil position information extraction step extracts, from the plurality of bottom part detection signals, the coil position information based on a portion inside a contour of the bottom part of the vehicle in which detection sensitivity that is an amount of change in the bottom part detection signal per unit distance significantly changes.

Owing to the configuration of the embodiment of the present disclosure, the bottom part detection sensor is the eddy current type distance sensor. The coil position information extraction step extracts, from the plurality of bottom part detection signals, the coil position information based on the portion inside the contour of the bottom part of the vehicle in which the detection sensitivity that is the amount of change in the bottom part detection signal per unit distance significantly changes.

As a result, the position of the electric power receiving coil with respect to the vehicle can be specified.

The wireless power transfer system according to the embodiment of the present disclosure is configured such that the bottom part detection sensor is a laser type distance sensor that outputs a bottom part detection signal that depends on a separation distance between the portion which enters the detection range and the detection unit, and the coil position information extraction step extracts, from the plurality of bottom part detection signals, the coil position information based on a portion inside a contour of the bottom part of the vehicle that coincides with a set contour that is a contour set in advance.

Owing to the configuration of the embodiment of the present disclosure, the bottom part detection sensor is the laser type distance sensor that outputs the bottom part detection signal that depends on the separation distance between the portion which enters the detection range and the detection unit. The coil position information extraction step extracts, from the plurality of bottom part detection signals, the coil position information based on the portion inside the contour of the bottom part of the vehicle that coincides with the set contour that is the contour set in advance.

As a result, the position of the electric power receiving coil with respect to the vehicle can be specified.

The wireless power transfer system according to the embodiment of the present disclosure is configured such that the bottom part detection sensor is a laser type distance sensor that outputs a bottom part detection signal that depends on a separation distance between the portion which enters the detection range and the detection unit, and the coil position information extraction step extracts, from the plurality of bottom part detection signals, the coil position information based on a portion inside a contour of the bottom part of the vehicle in which the bottom part detection signal does not change and is constant.

Owing to the configuration of the embodiment of the present disclosure, the bottom part detection sensor is the laser type distance sensor that outputs the bottom part detection signal that depends on the separation distance between the portion which enters the detection range and the detection unit. The coil position information extraction step extracts, from the plurality of bottom part detection signals, the coil position information based on the portion inside the contour of the bottom part of the vehicle in which the bottom part detection signal does not change and is constant.

As a result, the position of the electric power receiving coil with respect to the vehicle can be specified.

Effects of Disclosure

As described above, the wireless power transfer system according to an aspect of the present disclosure has the following effects owing to its configuration.

When the vehicle moves in the station at the predetermined speed, the bottom part detection sensor outputs the time-series bottom part detection signal in accordance with the portion, which enters the detection range, of the bottom part of the vehicle, and the coil position information is extracted from the time-series bottom part detection signal. Therefore, the position of the electric power receiving coil with respect to the vehicle can be specified.

The bottom part detection sensor outputs the bottom part detection signal that depends on the separation distance between the portion which enters the detection range and the detection unit, and on the magnetic property of the portion which enters the detection range, and the coil position information is extracted from the time-series bottom part detection signal based on the portion in which the detection sensitivity that is the amount of change in the bottom part detection signal per unit time significantly changes. Therefore, the position of the electric power receiving coil with respect to the vehicle can be specified.

The bottom part detection sensor outputs the bottom part detection signal that depends on the separation distance between the portion which enters the detection range and the detection unit, and the coil position information is extracted from the time-series bottom part detection signal based on the portion that coincides with the set contour. Therefore, the position of the electric power receiving coil with respect to the vehicle can be specified.

The bottom part detection sensor outputs the bottom part detection signal that depends on the separation distance between the portion which enters the detection range and the detection unit, and the coil position information is extracted from the time-series bottom part detection signal based on the portion in which the signal does not change and is constant. Therefore, the position of the electric power receiving coil with respect to the vehicle can be specified.

When the vehicle moving mechanism provided at the station moves the vehicle in the station at the constant speed, the bottom part detection sensor outputs the time-series bottom part detection signal. Therefore, the position of the electric power receiving coil with respect to the vehicle can be specified based on the coil position information extracted from the stable time-series bottom part detection signal.

The coil position information is extracted from the predetermined speed of the vehicle estimated based on the time-series vehicle body detection signal and the length of the vehicle output from the vehicle body detection sensor when the vehicle moves in the station, and is extracted from the time-series bottom part detection signal. Therefore, the position of the electric power receiving coil with respect to the vehicle can be specified.

When the vehicle moves in the station at the predetermined speed, the bottom part photographing apparatus photographs the bottom part of the vehicle, and the coil position information is extracted from the photographed video of the bottom part of the vehicle based on the position, inside the contour of the bottom part of the vehicle, of what coincides with the set contour. Therefore, the position of the electric power receiving coil with respect to the vehicle can be specified.

When the vehicle moves in the station at the predetermined speed, the bottom part photographing apparatus photographs the bottom part of the vehicle, and the coil position information is extracted from the photographed video of the bottom part of the vehicle based on the position, inside the contour of the bottom part of the vehicle, of what coincides with the set mark. Therefore, the position of the electric power receiving coil with respect to the vehicle can be specified.

When the vehicle is located at the station, the photographing apparatus photographs the vehicle, the vehicle type of the vehicle is specified from the photographed video, and the vehicle type of the vehicle and the coil position information are correlated with each other and recorded in the database. Therefore, the position of the electric power receiving coil with respect to each vehicle type can be specified based on the coil position information obtained from the vehicle type of the vehicle.

The database in which the plurality of vehicle types and the plurality of items of coil position information are correlated with each other and recorded in advance is prepared, and the coil position information correlated with the vehicle type specified from the video photographed by the photographing apparatus when the vehicle is located at the station is obtained. Therefore, the position of the electric power receiving coil with respect to the vehicle can be specified.

When the vehicle is located at the station at the predetermined speed, the plurality of bottom part detection sensors provided at the station to be spaced apart from each other outputs the respective plurality of bottom part detection signals in accordance with the portion, which enters the detection range, of the bottom part of the vehicle, and the coil position information is extracted from the plurality of bottom part detection signals. Therefore, the position of the electric power receiving coil with respect to the vehicle can be specified.

The bottom part detection sensor outputs the bottom part detection signal that depends on the separation distance between the portion which enters the detection range and the detection unit, and on the magnetic property of the portion which enters the detection range, and the coil position information is extracted from the plurality of bottom part detection signals based on the portion in which the detection sensitivity that is the amount of change in the bottom part detection signal per unit distance significantly changes. Therefore, the position of the electric power receiving coil with respect to the vehicle can be specified.

The bottom part detection sensor outputs the bottom part detection signal that depends on the separation distance between the portion which enters the detection range and the detection unit, and the coil position information is extracted from the plurality of bottom part detection signals based on the portion that coincides with the set contour. Therefore, the position of the electric power receiving coil with respect to the vehicle can be specified.

The bottom part detection sensor outputs the bottom part detection signal that depends on the separation distance between the portion which enters the detection range and the detection unit, and the coil position information is extracted from the plurality of bottom part detection signals based on the portion in which the signal does not change and is constant. Therefore, the position of the electric power receiving coil with respect to the vehicle can be specified.

Thus, the wireless power transfer system according to an aspect of the present disclosure can specify the position of the electric power receiving coil with respect to the vehicle.

DESCRIPTION OF EMBODIMENTS

Hereinafter, embodiments for practicing the present disclosure will be described with reference to the drawings.

To begin with, a wireless power transfer system according to a first embodiment of the present disclosure will be described based on the drawings.

Figure 1:
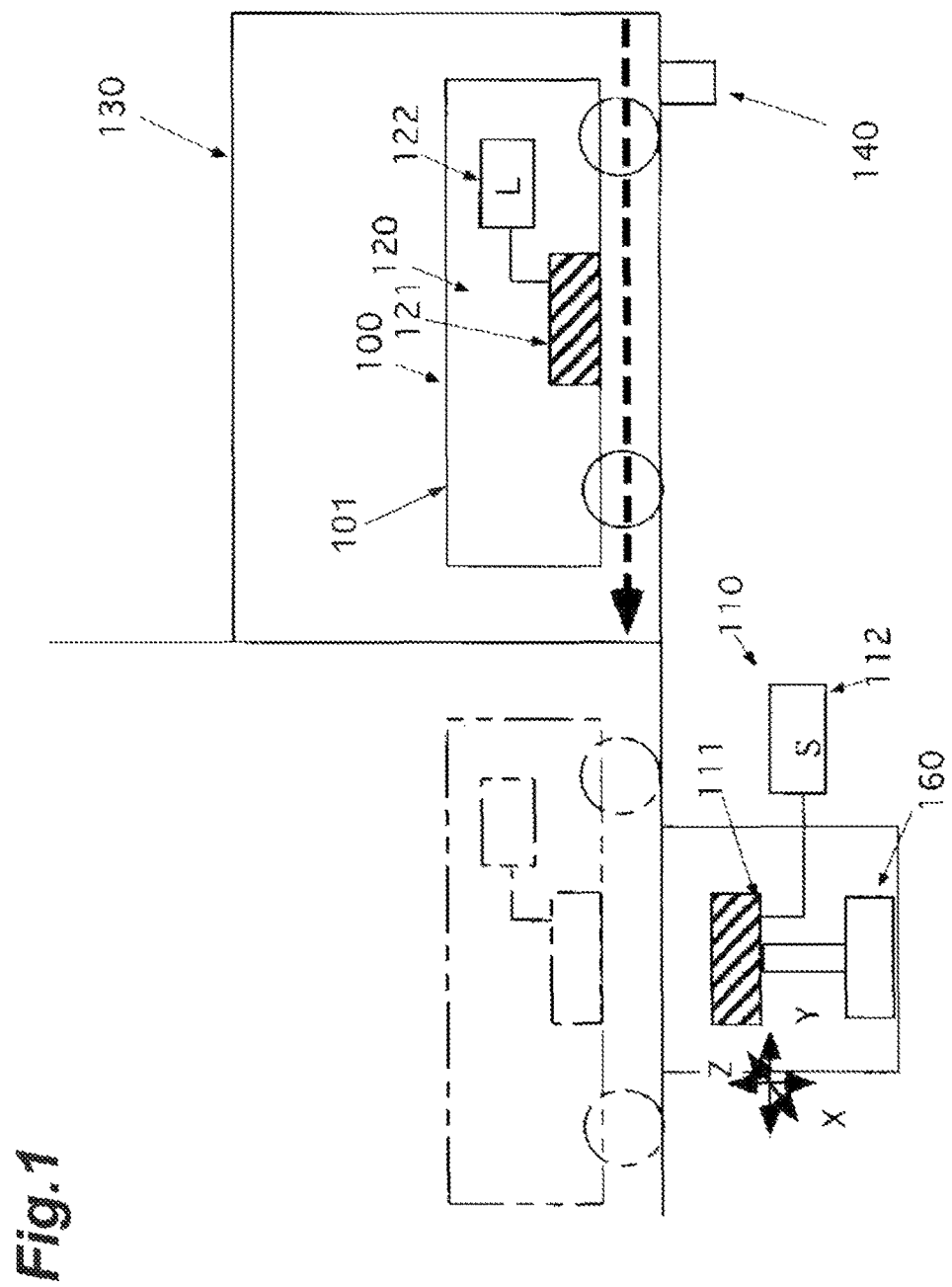
FIG. 1 is a diagram of a wireless power transfer system according to an embodiment of the present disclosure.
Figure 2:
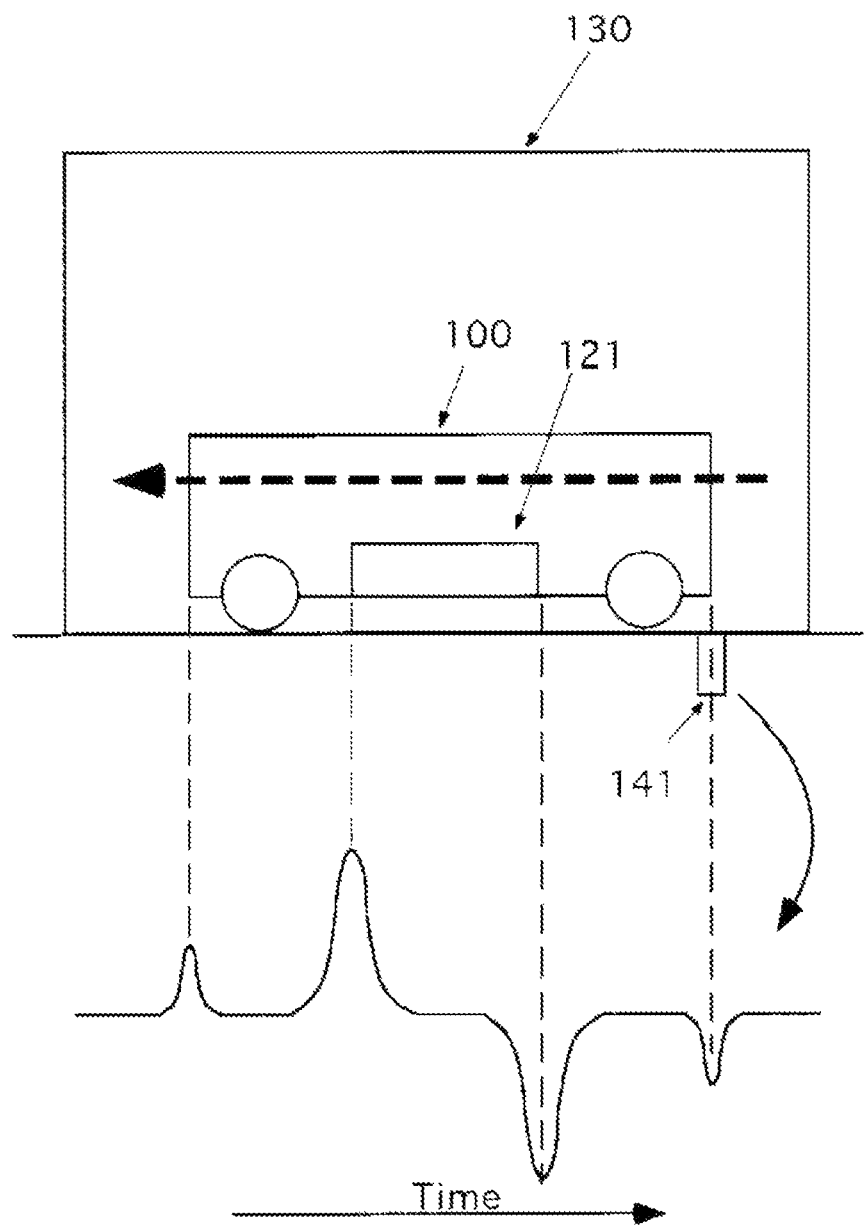
FIG. 2 is a diagram of a wireless power transfer system according to a first embodiment of the present disclosure.

FIG. 1 is a diagram of a wireless power transfer system according to an embodiment of the present disclosure. FIG. 2 is a diagram of the wireless power transfer system according to the first embodiment of the present disclosure.

The wireless power transfer system according to the first embodiment of the present disclosure is a system that supplies electric power to a vehicle in which an electric power receiving coil 121 capable of receiving wireless power transfer is incorporated.

A vehicle 100 includes a vehicle main body 101 and an electric power receiving apparatus 120.

The vehicle main body 101 is a main body of the vehicle.

The vehicle main body 101 can run by itself.

The vehicle main body 101 may be a car.

The electric power receiving apparatus 120 is a reception side apparatus to which electric power is fed in a wireless manner from an electric power supplying coil.

The electric power receiving apparatus 120 includes the electric power receiving coil 121 and a load 122.

The electric power receiving apparatus 120 may include the electric power receiving coil 121, the load 122, and an adjustment circuit (not illustrated).

The electric power receiving coil 121 is a reception side coil circuit for enabling wireless power transfer.

The adjustment circuit (not illustrated) is a circuit that adjusts electric and magnetic properties of the electric power receiving apparatus 120.

For example, the adjustment circuit (not illustrated) adjusts an electromagnetic resonance frequency of the electric power receiving apparatus 120.

The electric power receiving coil 121 is incorporated in the vehicle 100.

The wireless power transfer system according to the first embodiment of the present disclosure includes a station 130 and a bottom part detection sensor 141.

The wireless power transfer system according to the first embodiment of the present disclosure may include an electric power supplying apparatus 110, the station 130, and the bottom part detection sensor 141.

The wireless power transfer system according to the first embodiment of the present disclosure may include the electric power supplying apparatus 110, the station 130, the bottom part detection sensor 141, and a posture/position adjustment mechanism 160.

The electric power supplying apparatus 110 includes an electric power supplying coil 111, a drive circuit 112, and an adjustment circuit (not illustrated).

The electric power supplying coil 111 is a transmission side apparatus that can supply, in a wireless manner, electric power to the electric power receiving coil 121.

The electric power supplying coil 111 is a transmission side coil circuit that supplies electric power in a wireless manner.

The drive circuit 112 is an electric circuit that drives the electric power supplying coil 111.

For example, the drive circuit 112 supplies AC electric power having a predetermined frequency of the electric power supplying coil.

The adjustment circuit (not illustrated) is a circuit that adjusts electric and magnetic properties of the electric power supplying apparatus 110.

For example, the adjustment circuit (not illustrated) adjusts an electromagnetic resonance frequency of the electric power supplying apparatus 110.

The electric power supplying coil is provided at a specific position that is at least one particular position.

The specific position may be the station which will be described later.

The specific position may be a position different from the station which will be described later.

Electric power fed in a wireless manner from the electric power supplying coil 111 can be fed to the electric power receiving coil 121.

When an electric current flows in the electric power supplying coil 111, a magnetic field is generated in a space sandwiched between the electric power supplying coil 111 and the electric power receiving coil 121, and the generated magnetic field causes an electric current of the electric power supplying coil 111 to flow.

When a relative posture or position between the electric power supplying coil 111 and the electric power receiving coil 121 is set to a predetermined posture or position, electric power can be efficiently fed in a wireless manner from the electric power supplying coil 111 to the electric power receiving coil 121 with a small energy loss.

The station 130 is a space that the vehicle 100 can enter and leave.

The vehicle 100 can enter the station 130.

The vehicle 100 can leave the station 130.

The vehicle 100 can stop at the station 130.

The vehicle 100 can move in the station 130.

The vehicle 100 can run by itself to move in the station 130.

For example, the station 130 is an entry/exit station in a parking device.

The bottom part detection sensor 141 is a sensor having a detection unit capable of detecting an object that enters a detection range, provided at the station 130, and that outputs a bottom part detection signal in accordance with a portion, which enters the detection range, of a bottom part of the vehicle.

The bottom part detection sensor 141 may be an eddy current type distance sensor that outputs a bottom part detection signal that depends on a separation distance between the portion which enters the detection range and the detection unit, and on a magnetic property of the portion which enters the detection range.

The posture/position adjustment mechanism 160 is a mechanism that can adjust a relative posture or position between the electric power supplying coil 111 and the electric power receiving coil 121.

The posture/position adjustment mechanism 160 can adjust the relative posture or position between the electric power supplying coil 111 and the electric power receiving coil 121 to a predetermined posture or position.

The posture/position adjustment mechanism 160 may be provided at the specific position that is at least one particular position.

The posture/position adjustment mechanism 160 can adjust the relative posture or position between the electric power supplying coil 111 and the electric power receiving coil 121 to the predetermined posture or position based on position information of the electric power receiving coil 121 which will be described later.

Hereinafter, a method for controlling the wireless power transfer system according to the first embodiment of the present disclosure will be described.

The method for controlling the wireless power transfer system according to the first embodiment of the present disclosure includes a detection signal output step and a coil position information extraction step.

The method for controlling the wireless power transfer system according to the first embodiment of the present disclosure may include the detection signal output step, the coil position information extraction step, and a wireless power transfer step.

The detection signal output step is a step of outputting, by the bottom part detection sensor 141, a time-series bottom part detection signal when the vehicle moves in the station at a predetermined speed that is a prescribed speed.

The coil position information extraction step is a step of extracting, from the time-series bottom part detection signal, coil position information that is information related to a position of the electric power receiving coil 121 in the vehicle 100.

The coil position information extraction step may identify, from the time-series bottom part detection signal, the electric power receiving coil 121 located inside a contour of the bottom part of the vehicle 100, and extract the coil position information that is the information related to the position of the electric power receiving coil in the vehicle.

The coil position information extraction step may identify, from the time-series bottom part detection signal, a contour of the electric power receiving coil 121 located inside the contour of the bottom part of the vehicle 100, and extract the coil position information that is the information related to the position of the electric power receiving coil in the vehicle.

The coil position information extraction step may extract, from the time-series bottom part detection signal and the predetermined speed, the coil position information that is the information related to the position of the electric power receiving coil 121 in the vehicle 100.

The coil position information extraction step may identify, from the time-series bottom part detection signal and the predetermined speed, the contour of the electric power receiving coil 121 located inside the contour of the bottom part of the vehicle 100, and extract the coil position information that is the information related to the position of the electric power receiving coil in the vehicle.

The coil position information extraction step may extract, from the time-series bottom part detection signal, the coil position information based on a portion inside the contour of the bottom part of the vehicle 100 in which detection sensitivity that is an amount of change in the bottom part detection signal per unit time significantly changes.

The coil position information extraction step may extract, assuming that a distance between the detection unit and a bottom surface of the vehicle 100 is constant when the vehicle travels in the station, from the time-series bottom part detection signal, the coil position information based on the portion inside the contour of the bottom part of the vehicle in which the detection sensitivity that is the amount of change in the bottom part detection signal per unit time significantly changes.

The coil position information extraction step may extract, assuming that the distance between the detection unit and the bottom surface of the vehicle 100 is constant when the vehicle travels in the station, from the time-series bottom part detection signal, the coil position information, with the portion inside the contour of the bottom part of the vehicle in which the detection sensitivity that is the amount of change in the bottom part detection signal per unit time significantly changes determined as a position of the contour of the electric power receiving coil.

In FIG. 2, detection sensitivity of time-series sensor output is illustrated.

It can be understood that the detection sensitivity significantly changes in a boundary between the vehicle main body 101 and the electric power receiving coil 121 since an electromagnetic property of the vehicle main body 101 and an electromagnetic property of the electric power receiving coil are significantly different.

The wireless power transfer step is a step of supplying, in a wireless manner, electric power from the electric power supplying coil 111 to the electric power receiving coil 121 based on the coil position information.

The wireless power transfer step may supply, in a wireless manner, electric power from the electric power supplying coil 111 to the electric power receiving coil 121 after the posture/position adjustment mechanism 160 adjusts the relative posture or position between the electric power supplying coil 111 and the electric power receiving coil 121 incorporated in the vehicle 100 based on the information related to the position of the electric power receiving coil 121 in the vehicle corresponding to the coil position information.

The wireless power transfer step may supply, in a wireless manner, electric power from the electric power supplying coil 111 to the electric power receiving coil 121 after the posture/position adjustment mechanism 160 adjusts the relative posture or position between the electric power supplying coil 111 and the electric power receiving coil 121 incorporated in the vehicle 100 based on the information related to the position of the electric power receiving coil 121 in the vehicle corresponding to the coil position information when the vehicle is located at the specific position.

Next, a wireless power transfer system according to a second embodiment of the present disclosure will be described based on the drawings.

Figure 3:
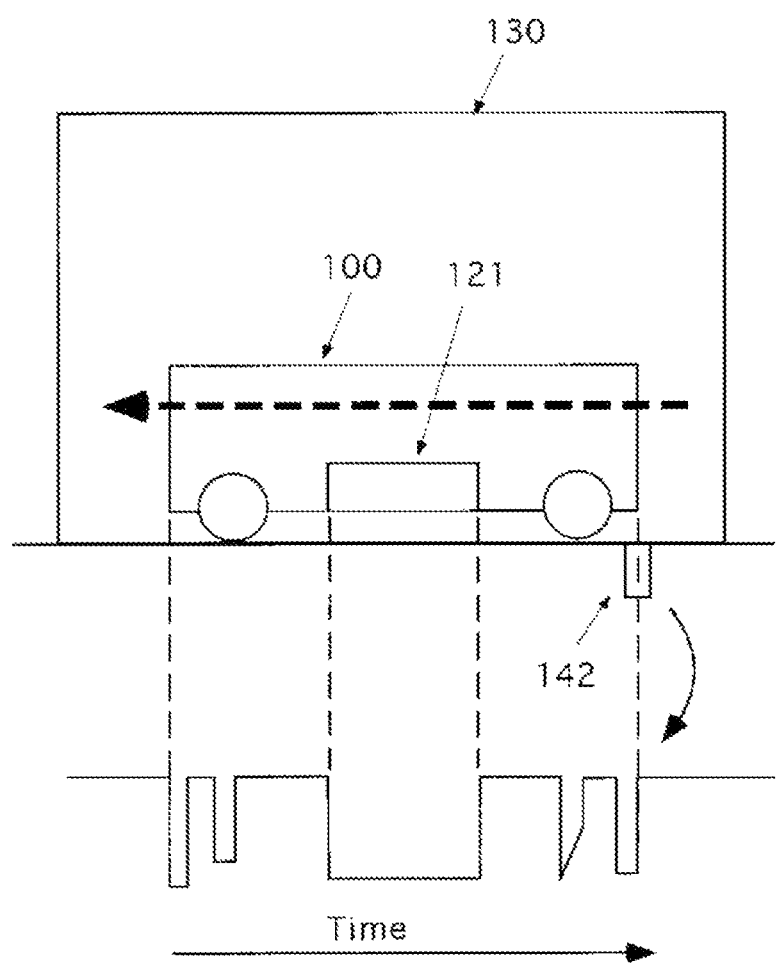
FIG. 3 is a diagram of a wireless power transfer system according to a second embodiment of the present disclosure.

FIG. 3 is a diagram of the wireless power transfer system according to the second embodiment of the present disclosure.

The wireless power transfer system according to the second embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the second embodiment of the present disclosure includes a station 130 and a bottom part detection sensor 142.

The wireless power transfer system according to the second embodiment of the present disclosure may include an electric power supplying apparatus 110, the station 130, and the bottom part detection sensor 142.

The wireless power transfer system according to the second embodiment of the present disclosure may include the electric power supplying apparatus 110, the station 130, the bottom part detection sensor 142, and a posture/position adjustment mechanism 160.

Since the configurations of the electric power supplying apparatus 110, the station 130, and the posture/position adjustment mechanism 160 are the same as those of the wireless power transfer system according to the first embodiment, the description will be omitted.

The bottom part detection sensor 142 is a sensor having a detection unit capable of detecting an object that enters a detection range, provided at the station 130, and that outputs a bottom part detection signal in accordance with a portion, which enters the detection range, of a bottom part of the vehicle.

The bottom part detection sensor 142 may be a laser type distance sensor that outputs a bottom part detection signal that depends on a separation distance between the portion which enters the detection range and the detection unit.

Hereinafter, a method for controlling the wireless power transfer system according to the second embodiment of the present disclosure will be described.

The method for controlling the wireless power transfer system according to the second embodiment of the present disclosure includes a detection signal output step and a coil position information extraction step.

The method for controlling the wireless power transfer system according to the second embodiment of the present disclosure may include the detection signal output step, the coil position information extraction step, and a wireless power transfer step.

Since the configurations of the detection signal output step and the wireless power transfer step are the same as those of the wireless power transfer system according to the first embodiment, the description will be omitted.

The coil position information extraction step is a step of extracting, from the time-series bottom part detection signal, coil position information that is information related to a position of the electric power receiving coil 121 in the vehicle 100.

The coil position information extraction step may identify, from the time-series bottom part detection signal, the electric power receiving coil 121 located inside a contour of the bottom part of the vehicle 100, and extract the coil position information that is the information related to the position of the electric power receiving coil 121 in the vehicle.

The coil position information extraction step may identify, from the time-series bottom part detection signal, a contour of the electric power receiving coil 121 located inside the contour of the bottom part of the vehicle 100, and extract the coil position information that is the information related to the position of the electric power receiving coil 121 in the vehicle.

The coil position information extraction step may extract, from the time-series bottom part detection signal and the predetermined speed, the coil position information that is the information related to the position of the electric power receiving coil 121 in the vehicle 100.

The coil position information extraction step may identify, from the time-series bottom part detection signal and the predetermined speed, the contour of the electric power receiving coil 121 located inside the contour of the bottom part of the vehicle 100, and extract the coil position information that is the information related to the position of the electric power receiving coil 121 in the vehicle.

Hereinafter, two variations of the coil position information extraction step will be described.

A first variation of the coil position information extraction step will be described.

The coil position information extraction step may extract, from the time-series bottom part detection signal, the coil position information based on a portion inside the contour of the bottom part of the vehicle 100 that coincides with a set contour that is a contour set in advance.

The coil position information extraction step may extract, when the vehicle 100 travels in the station 130, from the time-series bottom part detection signal, the coil position information based on the portion inside the contour of the bottom part of the vehicle 100 that coincides with the set contour that is the contour set in advance.

The coil position information extraction step extracts, from the time-series bottom part detection signal and the predetermined speed, the coil position information based on the portion inside the contour of the bottom part of the vehicle 100 that coincides with the set contour that is the contour set in advance.

The coil position information extraction step may extract, from the time-series bottom part detection signal, the coil position information, with the portion inside the contour of the bottom part of the vehicle 100 that coincides with the set contour that is the contour set in advance determined as the contour of the electric power receiving coil.

The coil position information extraction step may extract, when the vehicle 100 travels in the station 130, from the time-series bottom part detection signal and the predetermined speed, the coil position information, with the portion inside the contour of the bottom part of the vehicle 100 that coincides with the set contour that is the contour set in advance determined as the contour of the electric power receiving coil 121.

A second variation of the coil position information extraction step will be described.

The coil position information extraction step may extract, from the time-series bottom part detection signal, the coil position information based on a portion inside the contour of the bottom part of the vehicle 100 in which the bottom part detection signal does not change and is constant.

The coil position information extraction step may extract, when the vehicle 100 travels in the station 130, from the time-series bottom part detection signal, the coil position information based on the portion inside the contour of the bottom part of the vehicle 100 in which the bottom part detection signal does not change and is constant.

The coil position information extraction step may extract, from the time-series bottom part detection signal and the predetermined speed, the coil position information, with the portion inside the contour of the bottom part of the vehicle 100 in which the bottom part detection signal does not change and is constant determined as the position of the electric power receiving coil 121.

The coil position information extraction step may extract, from the time-series bottom part detection signal, the coil position information, with the portion inside the contour of the bottom part of the vehicle 100 in which the bottom part detection signal does not change and is constant determined as the position of the electric power receiving coil 121.

The coil position information extraction step may extract, when the vehicle travels in the station, from the time-series bottom part detection signal and the predetermined speed, the coil position information, with the portion inside the contour of the bottom part of the vehicle in which the bottom part detection signal does not change and is constant determined as the position of the electric power receiving coil 121.

Next, a wireless power transfer system according to a third embodiment of the present disclosure will be described based on the drawings.

Figure 4:
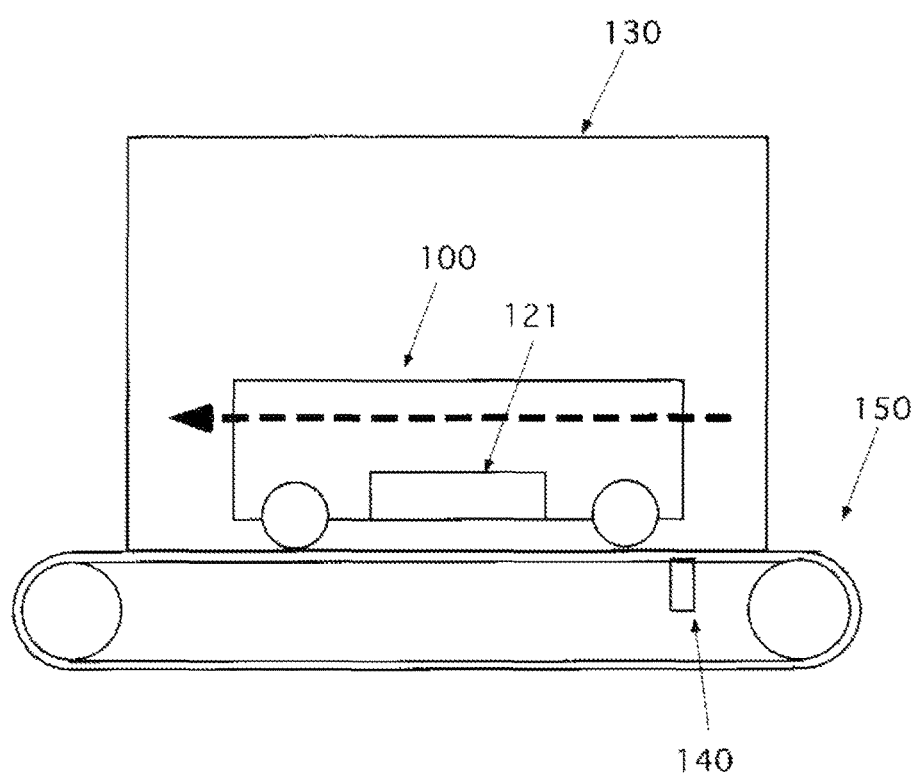
FIG. 4 is a diagram of a wireless power transfer system according to a third embodiment of the present disclosure.

FIG. 4 is a diagram of the wireless power transfer system according to the third embodiment of the present disclosure.

The wireless power transfer system according to the third embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the third embodiment of the present disclosure includes a station 130, a bottom part detection sensor 140, and a vehicle moving mechanism 150.

The wireless power transfer system according to the third embodiment of the present disclosure may include an electric power supplying apparatus 110, the station 130, the bottom part detection sensor 140, and the vehicle moving mechanism 150.

The wireless power transfer system according to the third embodiment of the present disclosure may include the electric power supplying apparatus 110, the station 130, the bottom part detection sensor 140, the vehicle moving mechanism 150, and a posture/position adjustment mechanism 160.

Since the configurations of the electric power supplying apparatus 110, the station 130, and the posture/position adjustment mechanism 160 are the same as those of the wireless power transfer system according to the first embodiment, the description will be omitted.

The bottom part detection sensor 140 is any one of those of the wireless power transfer systems according to the first or the second embodiments.

The vehicle moving mechanism 150 is a mechanism provided at the station and capable of supporting the vehicle and moving the vehicle at a constant speed.

The vehicle moving mechanism 150 may be a belt conveyer mechanism that can support the vehicle 100 with a belt and circularly move the belt at the constant speed.

The vehicle moving mechanism 150 may be a mechanism that can support the vehicle 100 with a pallet and move the pallet at the constant speed.

Hereinafter, a method for controlling the wireless power transfer system according to the third embodiment of the present disclosure will be described.

The method for controlling the wireless power transfer system according to the third embodiment of the present disclosure includes a detection signal output step and a coil position information extraction step.

The method for controlling the wireless power transfer system according to the third embodiment of the present disclosure may include the detection signal output step, the coil position information extraction step, and a wireless power transfer step.

Since the configurations of the coil position information extraction step and the wireless power transfer step are the same as one of those of the wireless power transfer systems according to the first to second embodiments, the description will be omitted.

The detection signal output step is a step of outputting, by the bottom part detection sensor 140, a time-series bottom part detection signal when the vehicle moving mechanism 150 moves the vehicle 100 in the station 130 at the constant speed.

Next, a wireless power transfer system according to a fourth embodiment of the present disclosure will be described based on the drawings.

Figure 5:
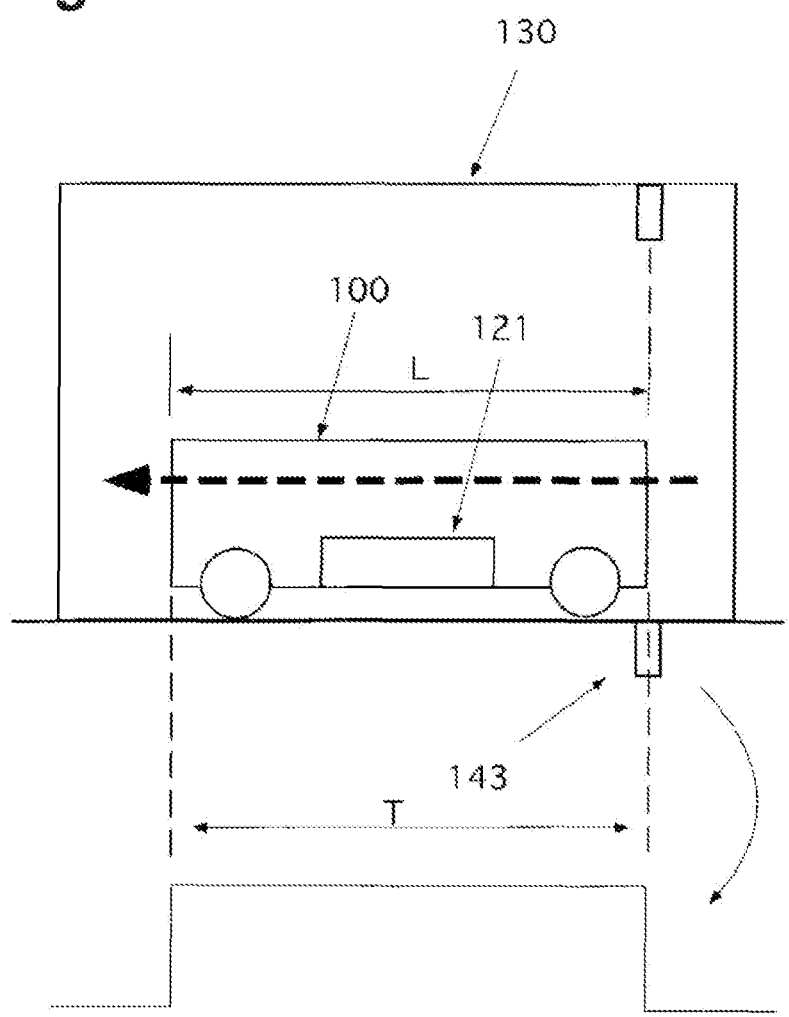
FIG. 5 is a diagram of a wireless power transfer system according to a fourth embodiment of the present disclosure.

FIG. 5 is a diagram of the wireless power transfer system according to the fourth embodiment of the present disclosure.

The wireless power transfer system according to the fourth embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the fourth embodiment of the present disclosure includes a station 130, a bottom part detection sensor 140, and a vehicle body detection sensor 143.

The wireless power transfer system according to the fourth embodiment of the present disclosure may include an electric power supplying apparatus 110, the station 130, the bottom part detection sensor 140, and the vehicle body detection sensor 143.

The wireless power transfer system according to the fourth embodiment of the present disclosure may include the electric power supplying apparatus 110, the station 130, the bottom part detection sensor 140, the vehicle body detection sensor 143, and a posture/position adjustment mechanism 160.

Since the configurations of the electric power supplying apparatus 110, the station 130, the vehicle body detection sensor 143, and the posture/position adjustment mechanism 160 are the same as those of the wireless power transfer system according to the first embodiment, the description will be omitted.

Since the bottom part detection sensor 140 is one of those of the wireless power transfer systems according to the first or the second embodiments, the description will be omitted.

The vehicle body detection sensor 143 is a sensor that detects a vehicle body of the vehicle and outputs a vehicle body detection signal.

The vehicle body detection sensor 143 may be a sensor including a light emitting sensor and a light receiving sensor and configured such that the light receiving sensor detects that a ray emitted by the light emitting sensor is blocked by the vehicle body.

Hereinafter, a method for controlling the wireless power transfer system according to the fourth embodiment of the present disclosure will be described.

The method for controlling the wireless power transfer system according to the fourth embodiment of the present disclosure includes a detection signal output step, a predetermined speed estimation step, and a coil position information extraction step.

The method for controlling the wireless power transfer system according to the fourth embodiment of the present disclosure may include the detection signal output step, the predetermined speed estimation step, the coil position information extraction step, and a wireless power transfer step.

Since the configurations of the detection signal output step and the wireless power transfer step are the same as those of the method for controlling the wireless power transfer system according to the first or second embodiment, the description will be omitted.

The predetermined speed estimation step estimates, when the vehicle moves in the station, a predetermined speed of the vehicle based on a time-series vehicle body detection signal and a length of the vehicle output from the vehicle body detection sensor.

For example, a value obtained by dividing the length L of the vehicle by a time T obtained from the time-series vehicle body detection signal is assumed to be the predetermined speed V of the vehicle.

The coil position information extraction step extracts, from the time-series bottom part detection signal and the predetermined speed estimated in the predetermined speed estimation step, coil position information that is information related to a position of the electric power receiving coil in the vehicle.

The position of the electric power receiving coil in the vehicle can be calculated by multiplying a detection time of the electric power receiving coil in the time-series bottom part detection signal by a speed.

Since the other configurations of the coil position information extraction step are the same as those of the wireless power transfer system according to the first or second embodiment, the description will be omitted.

Next, a wireless power transfer system according to a fifth embodiment of the present disclosure will be described based on the drawings.

Figure 6:
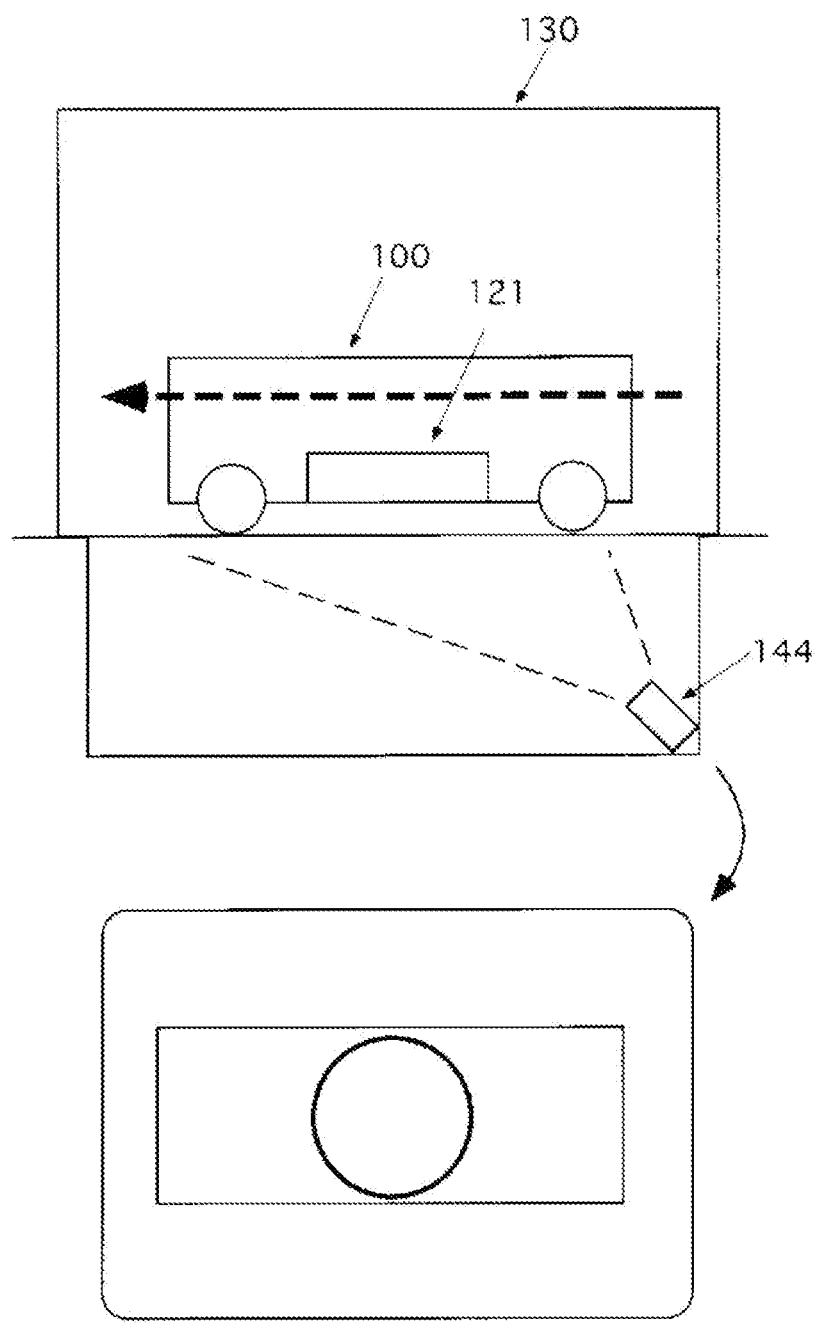
FIG. 6 is a diagram of a wireless power transfer system according to a fifth embodiment of the present disclosure.

FIG. 6 is a diagram of the wireless power transfer system according to the fifth embodiment of the present disclosure.

The wireless power transfer system according to the fifth embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the fifth embodiment of the present disclosure includes a station 130 and a bottom part photographing apparatus 144.

The wireless power transfer system according to the fifth embodiment of the present disclosure may include an electric power supplying apparatus 110, the station 130, and the bottom part photographing apparatus 144.

The wireless power transfer system according to the fifth embodiment of the present disclosure may include the electric power supplying apparatus 110, the station 130, the bottom part photographing apparatus 144, and a posture/position adjustment mechanism 160.

Since the configurations of the electric power supplying apparatus 110, the station 130, and the posture/position adjustment mechanism 160 are the same as those of the wireless power transfer system according to the first embodiment, the description will be omitted.

The bottom part photographing apparatus 144 is an apparatus provided at the station 130 and capable of photographing a bottom part of the vehicle.

For example, the bottom part photographing apparatus 144 includes a camera capable of photographing the bottom part of the vehicle and an analyzing apparatus that performs video analysis from digital data of a video obtained by the camera.

The bottom part photographing apparatus 144 is provided in a pit-like depression provided in a floor of the station 130.

Hereinafter, a method for controlling the wireless power transfer system according to the fifth embodiment of the present disclosure will be described.

The method for controlling the wireless power transfer system according to the fifth embodiment of the present disclosure includes a bottom part photographing step and a coil position information extraction step.

The method for controlling the wireless power transfer system according to the fifth embodiment of the present disclosure may include the bottom part photographing step, the coil position information extraction step, and a wireless power transfer step.

Since the wireless power transfer step is the same as that of the wireless power transfer system according to the first embodiment, the description will be omitted.

The bottom part photographing step is a step of photographing, by the bottom part photographing apparatus 144, the bottom part of the vehicle when the vehicle is located at the station.

The bottom part photographing step may photograph, by the bottom part photographing apparatus 144, the bottom part of the vehicle when the vehicle stops at the station.

The bottom part photographing step may photograph, by the bottom part photographing apparatus 144, the bottom part of the vehicle when the vehicle moves in the station.

The coil position information extraction step extracts, from a video of the bottom part of the vehicle photographed by the bottom part photographing apparatus 144, coil position information that is information related to a position of the electric power receiving coil based on a position, inside a contour of the bottom part of the vehicle, of what coincides with a set contour that is a contour set in advance.

The coil position information extraction step may extract, from the video of the bottom part of the vehicle photographed by the bottom part photographing apparatus 144, the coil position information that is the information related to the position of the electric power receiving coil, with the position, inside the contour of the bottom part of the vehicle, of what coincides with the set contour that is the contour set in advance regarded as the position of the electric power receiving coil.

Next, a wireless power transfer system according to a sixth embodiment of the present disclosure will be described based on the drawings.

Figure 7:
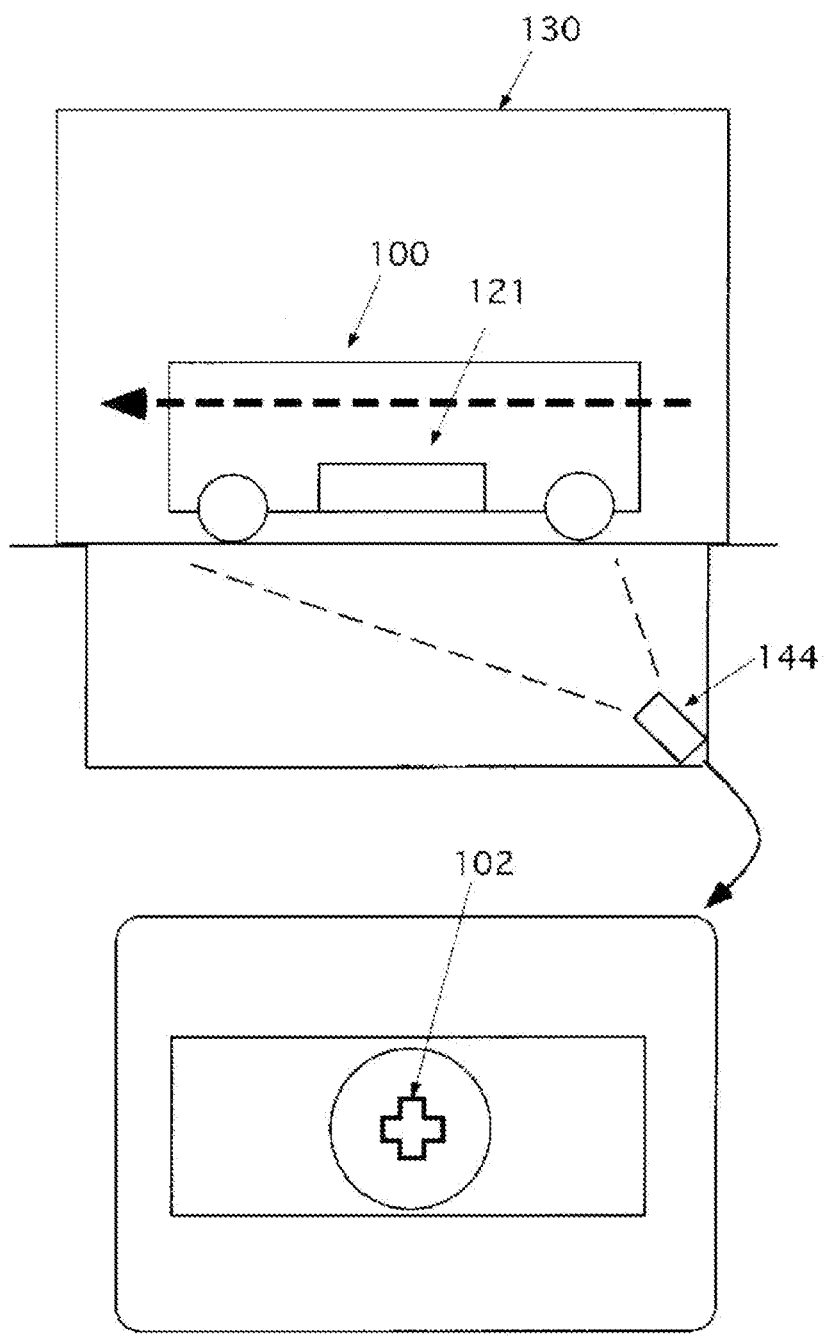
FIG. 7 is a diagram of a wireless power transfer system according to a sixth embodiment of the present disclosure.

FIG. 7 is a diagram of the wireless power transfer system according to the sixth embodiment of the present disclosure.

The wireless power transfer system according to the sixth embodiment of the present disclosure is a system that supplies electric power to a vehicle in which an electric power receiving coil 121 capable of receiving wireless power transfer is incorporated.

A bottom part of a vehicle is provided with a mark 102 at a position corresponding to a position of the electric power receiving coil.

A vehicle 100 includes a vehicle main body 101 and an electric power receiving apparatus 120.

The vehicle main body 101 is a main body of the vehicle.

The vehicle main body 101 can run by itself.

The vehicle main body 101 may be a car.

The vehicle main body 101 may be provided with the mark 102 at a position on a bottom part corresponding to the position of the electric power receiving coil.

The electric power receiving coil may be provided with the mark 102 on a bottom part thereof.

Since the configuration of the electric power receiving apparatus 120 is the same as that of the wireless power transfer system according to the first embodiment, the description will be omitted.

The wireless power transfer system according to the sixth embodiment of the present disclosure includes a station 130 and a bottom part photographing apparatus 144.

The wireless power transfer system according to the sixth embodiment of the present disclosure may include an electric power supplying apparatus 110, the station 130, and the bottom part photographing apparatus 144.

The wireless power transfer system according to the sixth embodiment of the present disclosure may include the electric power supplying apparatus 110, the station 130, the bottom part photographing apparatus 144, and a posture/position adjustment mechanism 160.

Since the configurations of the electric power supplying apparatus 110, the station 130, the bottom part photographing apparatus 144, and the posture/position adjustment mechanism 160 are the same as those of the wireless power transfer system according to the fifth embodiment, the description will be omitted.

Hereinafter, a method for controlling the wireless power transfer system according to the sixth embodiment of the present disclosure will be described.

The method for controlling the wireless power transfer system according to the sixth embodiment of the present disclosure includes a bottom part photographing step and a coil position information extraction step.

The method for controlling the wireless power transfer system according to the sixth embodiment of the present disclosure may include the bottom part photographing step, the coil position information extraction step, and a wireless power transfer step.

Since the configurations of the bottom part photographing step and the wireless power transfer step are the same as those of the method for controlling the wireless power transfer system according to the fifth embodiment, the description will be omitted.

The coil position information extraction step extracts, from a video of the bottom part of the vehicle photographed by the bottom part photographing apparatus, coil position information that is information related to the position of the electric power receiving coil in the vehicle based on a position, inside a contour of the bottom part of the vehicle, of what coincides with a set mark that is a mark set in advance.

The coil position information extraction step extracts, from the video of the bottom part of the vehicle photographed by the bottom part photographing apparatus, the coil position information that is the information related to the position of the electric power receiving coil in the vehicle, with the position, inside the contour of the bottom part of the vehicle, of what coincides with the set mark that is the mark set in advance regarded as the position of the electric power receiving coil.

Next, a wireless power transfer system according to a seventh embodiment of the present disclosure will be described based on the drawings.

Figure 8:
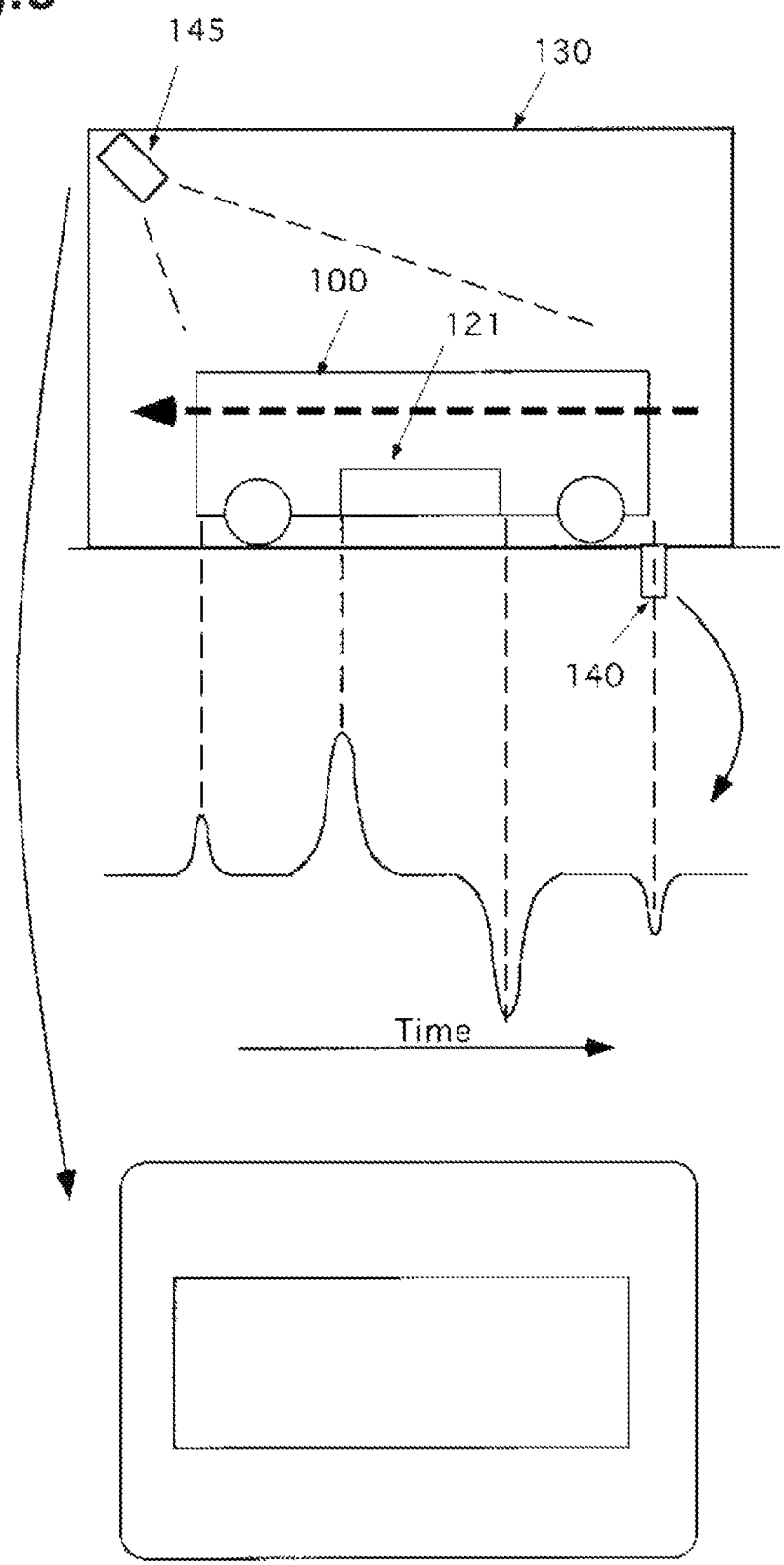
FIG. 8 is a diagram of a wireless power transfer system according to a seventh embodiment of the present disclosure.

FIG. 8 is a diagram of the wireless power transfer system according to the seventh embodiment of the present disclosure.

The wireless power transfer system according to the seventh embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the seventh embodiment of the present disclosure includes a station 130 and a photographing apparatus 145.

The wireless power transfer system according to the seventh embodiment of the present disclosure may include the station 130, the photographing apparatus 145, and a bottom part detection sensor 141.

The wireless power transfer system according to the seventh embodiment of the present disclosure may include the station 130, a bottom part photographing apparatus 144, and the photographing apparatus 145.

The wireless power transfer system according to the seventh embodiment of the present disclosure may include an electric power supplying apparatus 110, the station 130, and the bottom part detection sensor 141 or the bottom part photographing apparatus 144, and the photographing apparatus 145.

The wireless power transfer system according to the seventh embodiment of the present disclosure may include the electric power supplying apparatus 110, the station 130, and the bottom part detection sensor 141 or the bottom part photographing apparatus 144, and the photographing apparatus 145 and a posture/position adjustment mechanism 160.

Since the configurations of the electric power supplying apparatus 110, the station 130, and the bottom part detection sensor 141 or the bottom part photographing apparatus 144, and the posture/position adjustment mechanism 160 are the same as those mentioned above, the description will be omitted.

The photographing apparatus 145 is an apparatus provided at the station and capable of photographing the vehicle.

For example, the photographing apparatus 145 includes a camera capable of photographing the vehicle and an analyzing apparatus that performs video analysis from digital data of a video obtained by the camera.

For example, the photographing apparatus 145 photographs the vehicle at an angle suitable for specifying a vehicle type of the vehicle.

Hereinafter, a method for controlling the wireless power transfer system according to the seventh embodiment of the present disclosure will be described.

The method for controlling the wireless power transfer system according to the seventh embodiment of the present disclosure includes a vehicle photographing step, a vehicle type specifying step, and a vehicle type coil position information recording step.

The method for controlling the wireless power transfer system according to the seventh embodiment of the present disclosure may include a detection signal output step, a coil position information extraction step, the vehicle photographing step, the vehicle type specifying step, and the vehicle type coil position information recording step.

The method for controlling the wireless power transfer system according to the seventh embodiment of the present disclosure may include the detection signal output step, the coil position information extraction step, the vehicle photographing step, the vehicle type specifying step, the vehicle type coil position information recording step, and a wireless power transfer step.

Since the configurations of the detection signal output step, the coil position information extraction step, and the wireless power transfer step are the same as those mentioned above, the description will be omitted.

The vehicle photographing step is a step of photographing, by the photographing apparatus 145, the vehicle when the vehicle 100 is located at the station 130.

The vehicle photographing step may photograph, by the photographing apparatus 145, the vehicle when the vehicle stops at the station.

The vehicle photographing step may photograph, by the photographing apparatus, the vehicle when the vehicle moves in the station.

The vehicle type specifying step is a step of specifying the vehicle type of the vehicle from a video photographed by the photographing apparatus 145.

The vehicle type specifying step may record a plurality of videos correlated with a respective plurality of vehicle types in advance, and specify, as the vehicle type of the vehicle, a vehicle type correlated with a video that is the most approximate to the video photographed by the photographing apparatus.

The vehicle type coil position information recording step is a step of correlating the vehicle type of the vehicle with coil position information and recording, in a database, the vehicle type of the vehicle and the coil position information.

Next, a wireless power transfer system according to an eighth embodiment of the present disclosure will be described based on the drawings.

Figure 9:
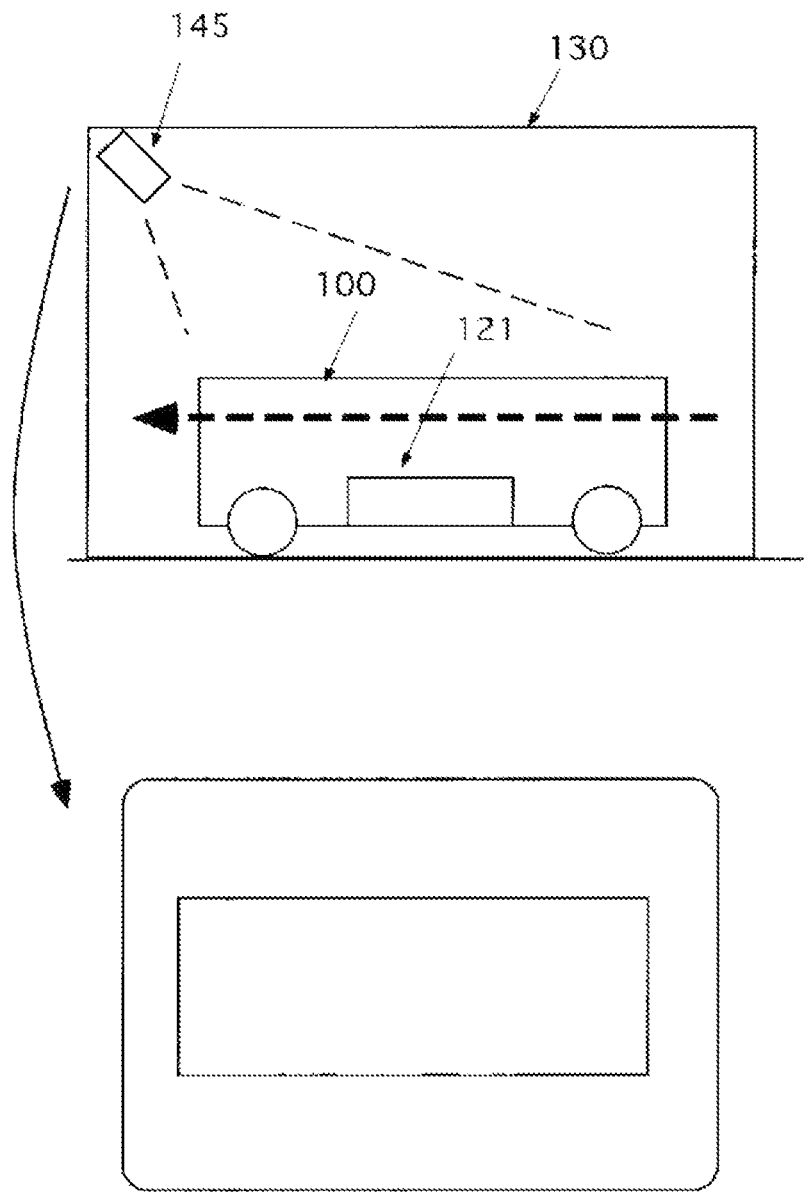
FIG. 9 is a diagram of a wireless power transfer system according to an eighth embodiment of the present disclosure.

FIG. 9 is a diagram of the wireless power transfer system according to the eighth embodiment of the present disclosure.

The wireless power transfer system according to the eighth embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the eighth embodiment of the present disclosure includes a station 130 and a photographing apparatus 145.

The wireless power transfer system according to the eighth embodiment of the present disclosure may include an electric power supplying apparatus 110, the station 130, and the photographing apparatus 145.

The wireless power transfer system according to the eighth embodiment of the present disclosure may include the electric power supplying apparatus 110, the station 130, the photographing apparatus 145, and a posture/position adjustment mechanism 160.

Since the configurations of the electric power supplying apparatus 110, the station 130, the photographing apparatus 145, and the posture/position adjustment mechanism 160 are the same as those mentioned above, the description will be omitted.

Hereinafter, a method for controlling the wireless power transfer system according to the eighth embodiment of the present disclosure will be described.

The method for controlling the wireless power transfer system according to the eighth embodiment of the present disclosure includes a preparation step, a vehicle photographing step, a vehicle type specifying step, and a coil position information obtaining step.

The method for controlling the wireless power transfer system according to the eighth embodiment of the present disclosure may include the preparation step, the vehicle photographing step, the vehicle type specifying step, the coil position information obtaining step, and a wireless power transfer step.

Since the configuration of the wireless power transfer step is the same as that described above, the description will be omitted.

The preparation step is a step of preparing a database in which a plurality of vehicle types and a plurality of items of coil position information that is information related to a position of the electric power receiving coil in the vehicle are correlated with each other and recorded in advance.

The vehicle photographing step is a step of photographing, by the photographing apparatus 145, the vehicle 100 when the vehicle 100 is located at the station 130.

The vehicle photographing step may photograph, by the photographing apparatus 145, the vehicle 100 when the vehicle 100 stops at the station 130.

The vehicle photographing step may photograph, by the photographing apparatus 145, the vehicle when the vehicle 100 moves in the station 130.

The vehicle type specifying step is a step of specifying the vehicle type of the vehicle from a video photographed by the photographing apparatus 145.

The vehicle type specifying step may record a plurality of videos correlated with the respective plurality of vehicle types in advance, and specify, as the vehicle type of the vehicle, a vehicle type correlated with a video that is the most approximate to the video photographed by the photographing apparatus.

The coil position information obtaining step is a step of obtaining, from the database, the coil position information correlated with the vehicle type of the vehicle specified in the vehicle type specifying step.

Next, a wireless power transfer system according to a ninth embodiment of the present disclosure will be described based on the drawings.

Figure 10:
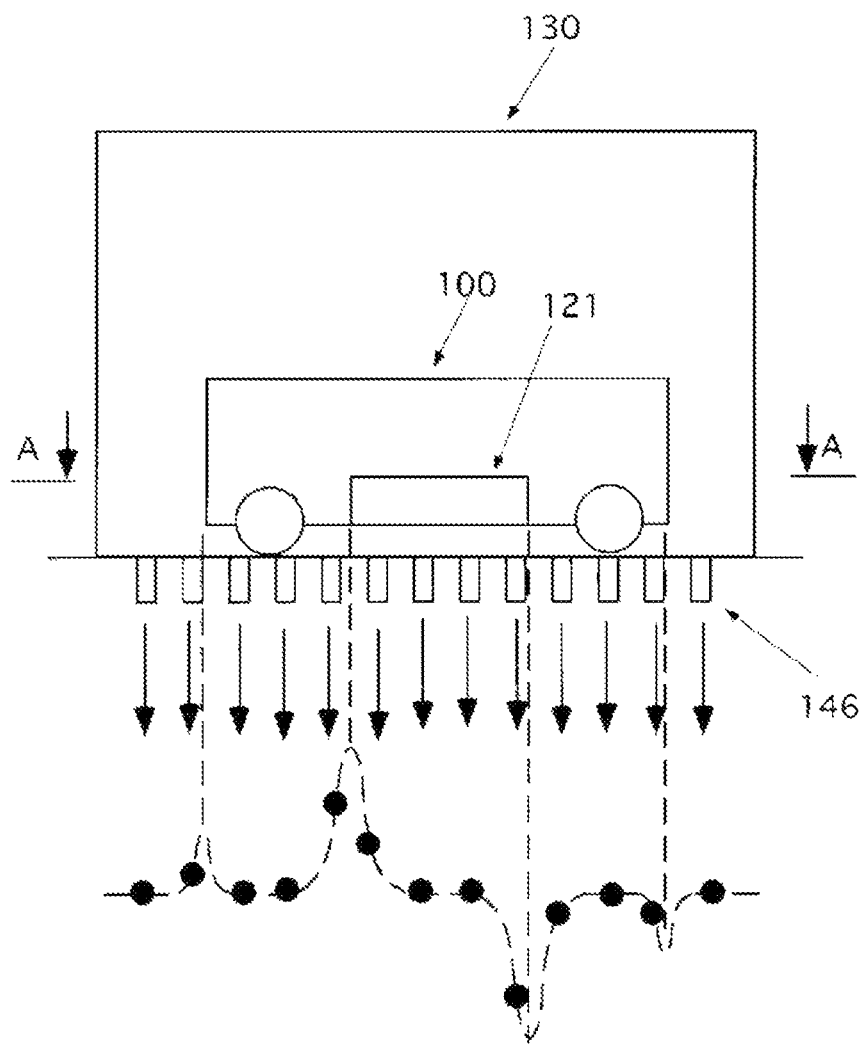
FIG. 10 is a diagram of a wireless power transfer system according to a ninth embodiment of the present disclosure.

FIG. 10 is a diagram of the wireless power transfer system according to the ninth embodiment of the present disclosure.

The wireless power transfer system according to the ninth embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the ninth embodiment of the present disclosure includes a station 130 and a plurality of bottom part detection sensors 146.

The wireless power transfer system according to the ninth embodiment of the present disclosure may include an electric power supplying apparatus 110, the station 130, and the plurality of bottom part detection sensors 146.

The wireless power transfer system according to the ninth embodiment of the present disclosure may include the electric power supplying apparatus 110, the station 130, the plurality of bottom part detection sensors 146, and a posture/position adjustment mechanism 160.

Since the configurations of the electric power supplying apparatus 110, the station 130, and the posture/position adjustment mechanism 160 are the same as those of the wireless power transfer system according to the first embodiment, the description will be omitted.

The plurality of bottom part detection sensors 146 has a detection unit capable of detecting an object that enters a detection range, is provided at the station and arranged to be spaced apart from each other, and outputs a bottom part detection signal in accordance with a portion, which enters the detection range, of a bottom part of the vehicle.

The bottom part detection sensor 146 may be an eddy current type distance sensor that outputs a bottom part detection signal that depends on a separation distance between the portion which enters the detection range and the detection unit, and on a magnetic property of the portion which enters the detection range.

Figure 12:
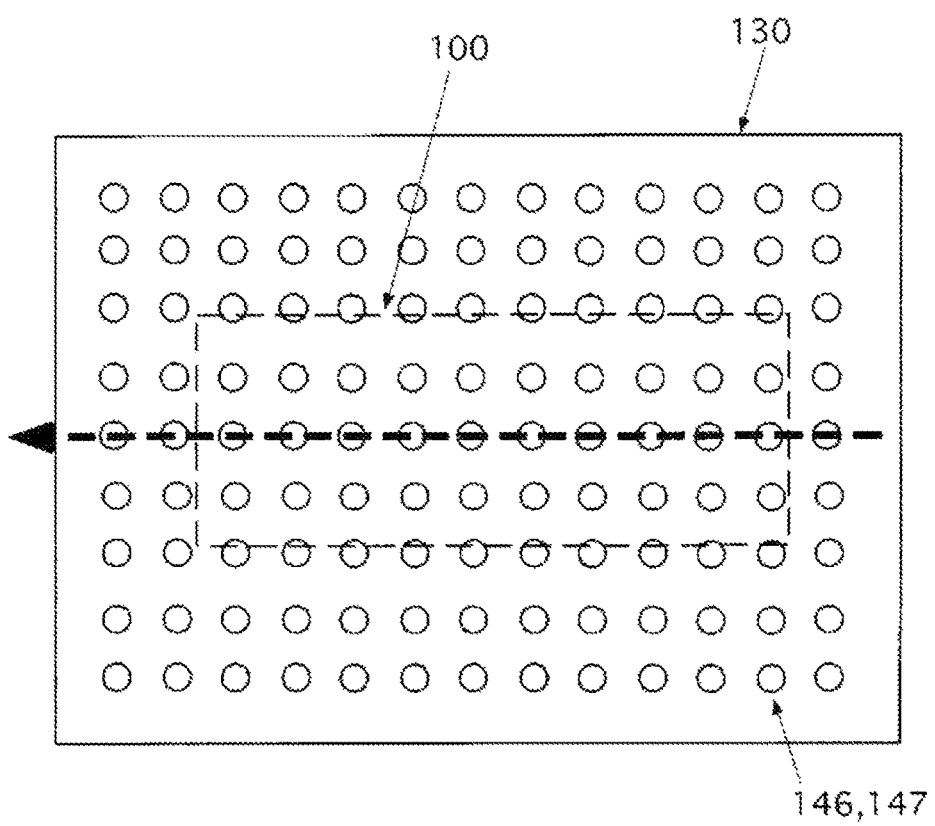
FIG. 12 is a diagram of the wireless power transfer system according to the ninth and tenth embodiments of the present disclosure.
Figure 13A:
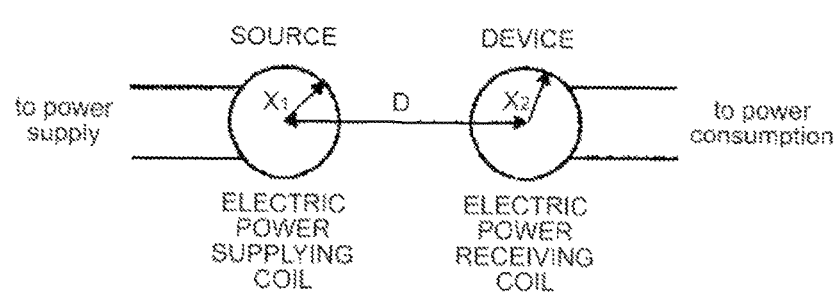
FIGS. 13A and 13B are diagrams of a wireless power transfer system.
Figure 13B:
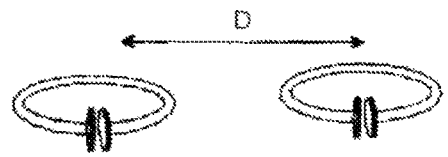

In FIG. 12, it is illustrated that the plurality of bottom part detection sensors 146 is provided to be arranged in a matrix shape on a floor of the station 130.

Hereinafter, a method for controlling the wireless power transfer system according to the ninth embodiment of the present disclosure will be described.

The method for controlling the wireless power transfer system according to the ninth embodiment of the present disclosure includes a detection signal output step and a coil position information extraction step.

The method for controlling the wireless power transfer system according to the ninth embodiment of the present disclosure may include the detection signal output step, the coil position information extraction step, and a wireless power transfer step.

Since the configuration of the wireless power transfer step is the same as that of the method for controlling the wireless power transfer system according to the first embodiment, the description will be omitted.

The detection signal output step is a step of outputting, by the plurality of bottom part detection sensors, a respective plurality of bottom part detection signals when the vehicle is located at the station.

The coil position information extraction step is a step of extracting, from the plurality of bottom part detection signals, coil position information that is information related to a position of the electric power receiving coil 121 in the vehicle 100.

The coil position information extraction step may extract, from the plurality of bottom part detection signals and a predetermined speed, the coil position information that is the information related to the position of the electric power receiving coil 121 in the vehicle.

The coil position information extraction step may identify, from the plurality of bottom part detection signals, the electric power receiving coil located inside a contour of the bottom part of the vehicle 100, and extract the coil position information that is the information related to the position of the electric power receiving coil in the vehicle.

The coil position information extraction step may identify, from the plurality of bottom part detection signals, a contour of the electric power receiving coil 121 located inside the contour of the bottom part of the vehicle 100, and extract the coil position information that is the information related to the position of the electric power receiving coil in the vehicle.

The coil position information extraction step may identify, from the plurality of bottom part detection signals and the predetermined speed, the contour of the electric power receiving coil 121 located inside the contour of the bottom part of the vehicle 100, and extract the coil position information that is the information related to the position of the electric power receiving coil in the vehicle.

The coil position information extraction step may extract, from the plurality of bottom part detection signals, the coil position information based on a portion inside the contour of the bottom part of the vehicle 100 in which detection sensitivity that is an amount of change in the bottom part detection signal per unit distance significantly changes.

The coil position information extraction step may extract, assuming that a distance between the detection unit and a bottom surface of the vehicle is constant when the vehicle 100 travels in the station 130, from the plurality of bottom part detection signals, the coil position information based on the portion inside the contour of the bottom part of the vehicle 100 in which the detection sensitivity that is the amount of change in the bottom part detection signal per unit distance significantly changes.

The coil position information extraction step may extract, from the plurality of bottom part detection signals, the coil position information, with the portion inside the contour of the bottom part of the vehicle 100 in which the detection sensitivity that is the amount of change in the bottom part detection signal per unit distance significantly changes determined as a position of the contour of the electric power receiving coil 121.

The coil position information extraction step may extract, assuming that the distance between the detection unit and the bottom surface of the vehicle 100 is constant when the vehicle 100 travels in the station 130, from the plurality of bottom part detection signals, the coil position information, with the portion inside the contour of the bottom part of the vehicle in which the detection sensitivity that is the amount of change in the bottom part detection signal per unit distance significantly changes determined as the position of the contour of the electric power receiving coil.

In FIG. 10, detection sensitivity of time-series sensor output is illustrated.

It can be understood that the detection sensitivity significantly changes in a boundary between the vehicle main body 101 and the electric power receiving coil 121 since an electromagnetic property of the vehicle main body 101 and an electromagnetic property of the electric power receiving coil are significantly different.

Next, a wireless power transfer system according to a tenth embodiment of the present disclosure will be described based on the drawings.

Figure 11:
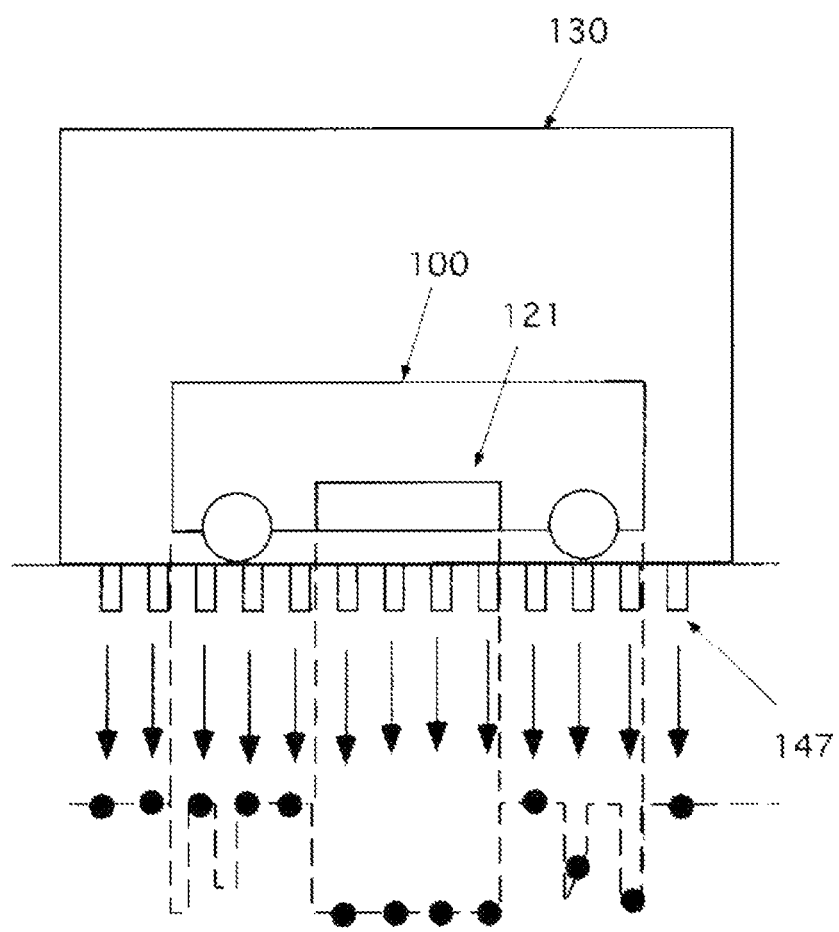
FIG. 11 is a diagram of a wireless power transfer system according to a tenth embodiment of the present disclosure.

FIG. 11 is a diagram of the wireless power transfer system according to the tenth embodiment of the present disclosure.

The wireless power transfer system according to the tenth embodiment of the present disclosure is a system that supplies electric power to a vehicle in which an electric power receiving coil 121 capable of receiving wireless power transfer is incorporated.

Since the configuration of the vehicle is the same as that of the wireless power transfer system according to the first embodiment, the description will be omitted.

The wireless power transfer system according to the tenth embodiment of the present disclosure includes a station 130 and a plurality of bottom part detection sensors 147.

The wireless power transfer system according to the tenth embodiment of the present disclosure may include an electric power supplying apparatus 110, the station 130, and the plurality of bottom part detection sensors 147.

The wireless power transfer system according to the tenth embodiment of the present disclosure may include the electric power supplying apparatus 110, the station 130, the plurality of bottom part detection sensors 147, and a posture/position adjustment mechanism 160.

Since the configurations of the electric power supplying apparatus 110, the station 130, and the posture/position adjustment mechanism 160 are the same as those of the wireless power transfer system according to the first embodiment, the description will be omitted.

The plurality of bottom part detection sensors 147 has a detection unit capable of detecting an object that enters a detection range, and is provided at the station and arranged to be spaced apart from each other. Each of the plurality of bottom part detection sensors 147 outputs a bottom part detection signal in accordance with a portion, which enters the detection range, of a bottom part of the vehicle.

The bottom part detection sensor 147 may be a laser type distance sensor that outputs a bottom part detection signal that depends on a separation distance between the portion which enters the detection range and the detection unit.

In FIG. 12, it is illustrated that the plurality of bottom part detection sensors 147 is provided to be arranged in a matrix shape on a floor of the station 130.

Hereinafter, a method for controlling the wireless power transfer system according to the tenth embodiment of the present disclosure will be described.

The method for controlling the wireless power transfer system according to the tenth embodiment of the present disclosure includes a detection signal output step and a coil position information extraction step.

The method for controlling the wireless power transfer system according to the tenth embodiment of the present disclosure may include the detection signal output step, the coil position information extraction step, and a wireless power transfer step.

Since the configurations of the detection signal output step and the wireless power transfer step are the same as those of the wireless power transfer system according to the ninth embodiment, the description will be omitted.

The coil position information extraction step is a step of extracting, from a plurality of bottom part detection signals, coil position information that is information related to a position of the electric power receiving coil 121 in the vehicle 100.

The coil position information extraction step may extract, from the plurality of bottom part detection signals and a predetermined speed, the coil position information that is the information related to the position of the electric power receiving coil 121 in the vehicle 100.

The coil position information extraction step may identify, from the plurality of bottom part detection signals, the electric power receiving coil 121 located inside a contour of the bottom part of the vehicle 100, and extract the coil position information that is the information related to the position of the electric power receiving coil in the vehicle.

The coil position information extraction step may identify, from the plurality of bottom part detection signals, a contour of the electric power receiving coil 121 located inside the contour of the bottom part of the vehicle 100, and extract the coil position information that is the information related to the position of the electric power receiving coil in the vehicle.

The coil position information extraction step may identify, from the plurality of bottom part detection signals and the predetermined speed, the contour of the electric power receiving coil 121 located inside the contour of the bottom part of the vehicle 100, and extract the coil position information that is the information related to the position of the electric power receiving coil in the vehicle.

Hereinafter, two variations of the coil position information extraction step will be described.

A first variation of the coil position information extraction step will be described.

The coil position information extraction step may extract, from the plurality of bottom part detection signals, the coil position information based on a portion inside the contour of the bottom part of the vehicle 100 that coincides with a set contour that is a contour set in advance.

The coil position information extraction step may extract, when the vehicle 100 travels in the station 130, from the plurality of bottom part detection signals, the coil position information based on the portion inside the contour of the bottom part of the vehicle 100 that coincides with the set contour that is the contour set in advance.

The coil position information extraction step may extract, from the plurality of bottom part detection signals, the coil position information, with the portion inside the contour of the bottom part of the vehicle 100 that coincides with the set contour that is the contour set in advance determined as a position of the contour of the electric power receiving coil 121.

The coil position information extraction step may extract, when the vehicle 100 travels in the station 130, from the plurality of bottom part detection signals, the coil position information, with the portion inside the contour of the bottom part of the vehicle 100 that coincides with the set contour that is the contour set in advance determined as the position of the contour of the electric power receiving coil 121.

A second variation of the coil position information extraction step will be described.

The coil position information extraction step may extract, from the plurality of bottom part detection signals, the coil position information based on a portion inside the contour of the bottom part of the vehicle 100 in which the bottom part detection signal does not change and is constant.

The coil position information extraction step may extract, when the vehicle 100 travels in the station 130, from the plurality of bottom part detection signals, the coil position information based on the portion inside the contour of the bottom part of the vehicle 100 in which the bottom part detection signal does not change and is constant.

The coil position information extraction step may extract, from the plurality of bottom part detection signals, the coil position information, with the portion inside the contour of the bottom part of the vehicle 100 in which the bottom part detection signal does not change and is constant determined as the position of the contour of the electric power receiving coil 121.

The coil position information extraction step may extract, when the vehicle 100 travels in the station 130, from the plurality of bottom part detection signals, the coil position information, with the portion inside the contour of the bottom part of the vehicle 100 in which the bottom part detection signal does not change and is constant determined as the position of the contour of the electric power receiving coil 121.

The wireless power transfer system according to the embodiment of the present disclosure has the following effects owing to its configuration.

When the vehicle 100 moves in the station 130 at the predetermined speed, the bottom part detection sensor 140 outputs the time-series bottom part detection signal in accordance with the portion, which enters the detection range, of the bottom part of the vehicle, and the coil position information is extracted from the time-series bottom part detection signal. Therefore, the position of the electric power receiving coil 121 in the vehicle 100 can be specified.

The bottom part detection sensor 141 outputs the bottom part detection signal that depends on the separation distance between the portion which enters the detection range and the detection unit, and on the magnetic property of the portion which enters the detection range, and the coil position information is extracted from the time-series bottom part detection signal based on the portion in which the detection sensitivity that is the amount of change in the bottom part detection signal per unit time significantly changes. Therefore, the position of the electric power receiving coil 121 in the vehicle 100 can be specified.

The bottom part detection sensor 142 outputs the bottom part detection signal that depends on the separation distance between the portion which enters the detection range and the detection unit, and the coil position information is extracted from the time-series bottom part detection signal based on the portion that coincides with the set contour. Therefore, the position of the electric power receiving coil 121 in the vehicle 100 can be specified.

The bottom part detection sensor 142 outputs the bottom part detection signal that depends on the separation distance between the portion which enters the detection range and the detection unit, and the coil position information is extracted from the time-series bottom part detection signal based on the portion in which the signal does not change and is constant. Therefore, the position of the electric power receiving coil 121 in the vehicle 100 can be specified.

When the vehicle moving mechanism 150 provided at the station 130 moves the vehicle 100 in the station 130 at the constant speed, the bottom part detection sensor 140 outputs the time-series bottom part detection signal. Therefore, the position of the electric power receiving coil 121 with respect to the vehicle 100 can be specified based on the coil position information extracted from the stable time-series bottom part detection signal.

The coil position information is extracted from the predetermined speed of the vehicle estimated based on the time-series vehicle body detection signal and the length of the vehicle 100 output from the vehicle body detection sensor 143 when the vehicle 100 moves in the station 130, and is extracted from the time-series bottom part detection signal. Therefore, the position of the electric power receiving coil 121 in the vehicle 100 can be specified.

When the vehicle 100 moves in the station 130 at the predetermined speed, the bottom part photographing apparatus 144 photographs the bottom part of the vehicle, and the coil position information is extracted from the photographed video of the bottom part of the vehicle based on the position, inside the contour of the bottom part of the vehicle, of what coincides with the set contour. Therefore, the position of the electric power receiving coil 121 in the vehicle 100 can be specified.

When the vehicle 100 moves in the station 130 at the predetermined speed, the bottom part photographing apparatus 144 photographs the bottom part of the vehicle, and the coil position information is extracted from the photographed video of the bottom part of the vehicle based on the position, inside the contour of the bottom part of the vehicle, of what coincides with the set mark. Therefore, the position of the electric power receiving coil 121 in the vehicle 100 can be specified.

When the vehicle 100 is located at the station 130, the photographing apparatus 145 photographs the vehicle, the vehicle type of the vehicle is specified from the photographed video, and the vehicle type of the vehicle and the coil position information are correlated with each other and recorded in the database. Therefore, the position of the electric power receiving coil 121 in each vehicle type of the vehicle 100 can be specified based on the coil position information obtained from the vehicle type of the vehicle.

The database in which the plurality of vehicle types and the plurality of items of coil position information are correlated with each other and recorded in advance is prepared, and the coil position information correlated with the vehicle type specified from the video photographed by the photographing apparatus 145 when the vehicle 100 is located at the station 130 is obtained. Therefore, the position of the electric power receiving coil 121 in the vehicle 100 can be specified.

When the vehicle 100 is located at the station 130 at the predetermined speed, the plurality of bottom part detection sensors 140 provided at the station to be spaced apart from each other outputs the respective plurality of bottom part detection signals in accordance with the portion, which enters the detection range, of the bottom part of the vehicle 100, and the coil position information is extracted from the plurality of bottom part detection signals. Therefore, the position of the electric power receiving coil 121 in the vehicle 100 can be specified.

The bottom part detection sensor 146 outputs the bottom part detection signal that depends on the separation distance between the portion which enters the detection range and the detection unit, and on the magnetic property of the portion which enters the detection range, and the coil position information is extracted from the plurality of bottom part detection signals based on the portion in which the detection sensitivity that is the amount of change in the bottom part detection signal per unit distance significantly changes. Therefore, the position of the electric power receiving coil 121 in the vehicle 100 can be specified.

The bottom part detection sensor 147 outputs the bottom part detection signal that depends on the separation distance between the portion which enters the detection range and the detection unit, and the coil position information is extracted from the plurality of bottom part detection signals based on the portion that coincides with the set contour. Therefore, the position of the electric power receiving coil 121 in the vehicle 100 can be specified.

The bottom part detection sensor 147 outputs the bottom part detection signal that depends on the separation distance between the portion which enters the detection range and the detection unit, and the coil position information is extracted from the plurality of bottom part detection signals based on the portion in which the signal does not change and is constant. Therefore, the position of the electric power receiving coil 121 in the vehicle 100 can be specified.

The present disclosure is not limited to the above-mentioned embodiments, and can be variously changed in a range not deviating from the gist of the disclosure.

Although an exemplary case where the present disclosure is applied to the parking device has been described, the present disclosure is not limited to this exemplary case. For example, such a case may be employed that a transfer apparatus or a storage space is not included.

A moving mechanism of the parking device may be configured to be a circulation mechanism such as an elevator parking device, a box circulation parking device, a horizontal circulation parking device, a merry-go-round parking device, an elevator sliding parking device, a plane reciprocating parking device, a transporting storage parking device, and a two-stage or multiple-stage parking device.

INDUSTRIAL APPLICABILITY

According to some aspects of the present disclosure, a position of an electric power receiving coil with respect to a vehicle can be specified.

REFERENCE SIGNS LIST

L length of vehicle (entire length)
T time
100 vehicle
101 vehicle main body
102 mark
110 electric power supplying apparatus
111 electric power supplying coil
112 drive circuit
120 electric power receiving apparatus
121 electric power receiving coil
122 load
130 station
140 bottom part detection sensor
141 bottom part detection sensor
142 bottom part detection sensor
143 vehicle body detection sensor
144 bottom part photographing apparatus
145 photographing apparatus
146 bottom part detection sensor
147 bottom part detection sensor
150 vehicle moving mechanism
160 posture/position adjustment mechanism

The invention claimed is:

1. A wireless power transfer system that supplies electric power to a vehicle in which an electric power receiving coil capable of receiving wireless power transfer is incorporated, the wireless power transfer system comprising:
    a station that the vehicle is capable of entering and leaving; and
    a bottom part detection sensor having a detection unit capable of detecting an object that enters a detection range, provided at the station, and that outputs a bottom part detection signal corresponding to a portion, which enters the detection range, of a bottom part of the vehicle, wherein
    the wireless power transfer system:
    measures, using the bottom part detection sensor, the bottom part of the vehicle from a front end to a rear end,
    outputs a time-series bottom part detection signal when the vehicle moves in the station at a predetermined speed that is a prescribed speed; and
    extracts, from a time dependence of the time-series bottom part detection signal, coil position information that indicates information about a position of the electric power receiving coil in the vehicle.

2. The wireless power transfer system according to claim 1, wherein
    the bottom part detection sensor is an eddy current type distance sensor that outputs a bottom part detection signal corresponding to a separation distance between the portion which enters the detection range and the detection unit, and to a magnetic property of the portion which enters the detection range, and
    the coil position information is further based on a portion inside a contour of the bottom part of the vehicle in which detection sensitivity that is an amount of change in the bottom part detection signal per unit time significantly changes.

3. The wireless power transfer system according to claim 1, wherein
    the bottom part detection sensor is a laser type distance sensor that outputs a bottom part detection signal corresponding to a separation distance between the portion which enters the detection range and the detection unit, and
    the coil position information is further based on a portion inside a contour of the bottom part of the vehicle that matches a preset contour that is a contour preset in advance.

4. The wireless power transfer system according to claim 1, wherein
    the bottom part detection sensor is a laser type distance sensor that outputs a bottom part detection signal corresponding to a separation distance between the portion which enters the detection range and the detection unit, and
    the coil position information is further based on a portion inside a contour of the bottom part of the vehicle in which the bottom part detection signal does not change and is constant.

5. The wireless power transfer system according to claim 2, comprising a vehicle moving mechanism provided at the station and capable of supporting the vehicle and moving the vehicle at a constant speed, wherein
    the bottom part detection sensor outputs the time-series bottom part detection signal when the vehicle moving mechanism moves the vehicle in the station at the constant speed.

6. The wireless power transfer system according to claim 5, further comprising:
    a vehicle body detection sensor that detects a vehicle body of the vehicle and outputs a vehicle body detection signal, and
    wherein the wireless power transfer system further:
    estimates when the vehicle moves in the station, the predetermined speed of the vehicle based on a time-series vehicle body detection signal output from the vehicle body detection sensor and a length of the vehicle, wherein
    the coil position information is based on the time-series bottom part detection signal and the predetermined speed, the coil position information that is the information about the position of the electric power receiving coil in the vehicle.

7. A wireless power transfer system that supplies electric power to a vehicle in which an electric power receiving coil capable of receiving wireless power transfer is incorporated, a bottom part of the vehicle being provided with a mark at a position corresponding to a position of the electric power receiving coil, the wireless power transfer system comprising:
    a station that the vehicle is capable of entering and leaving; and
    a bottom part photographing apparatus provided at the station and capable of photographing the bottom part of the vehicle, wherein the wireless power transfer system:
photographs, using the bottom part photographing apparatus, the bottom part of the vehicle when the vehicle is located at the station; and
extracts from an image of the bottom part of the vehicle photographed by the bottom part photographing apparatus, coil position information that indicates information about the position of the electric power receiving coil in the vehicle based on a position, inside a contour of the bottom part of the vehicle, of what matches a preset mark that is a mark preset in advance.

8. The wireless power transfer system according to claim 1, comprising a photographing apparatus provided at the station and capable of photographing the vehicle, wherein the wireless power transfer system:
photographs, using the photographing apparatus the vehicle when the vehicle is located at the station;
specifies a vehicle type of the vehicle from an image photographed by the photographing apparatus; and
associates the vehicle type of the vehicle with the coil position information and recording, in a database, the vehicle type of the vehicle and the coil position information.

9. The wireless power transfer system according to claim 7, wherein
the wireless power transfer system:
photographs, using the photographing apparatus, the vehicle when the vehicle is located at the station;
specifies a vehicle type of the vehicle from an image photographed by the photographing apparatus; and
associates the vehicle type of the vehicle with the coil position information and recording, in a database, the vehicle type of the vehicle and the coil position information.

10. The wireless power transfer system according to claim 1, comprising a photographing apparatus provided at the station and capable of photographing the vehicle, wherein the wireless power transfer system:
stores in a database a plurality of vehicle types and a plurality of items of coil position information that is information about a position of the electric power receiving coil in the vehicle are associated with each other and recorded in advance;
photographs, using the photographing apparatus, the vehicle when the vehicle is located at the station;
specifies a vehicle type of the vehicle from an image photographed by the photographing apparatus; and
obtains, from the database, the coil position information associated with the vehicle type specified.

11. The wireless power transfer system according to claim 7 wherein
the wireless power transfer system:
stores in a database a plurality of vehicle types and a plurality of items of coil position information that is information about a position of the electric power receiving coil in the vehicle are associated with each other and recorded in advance;
photographs, using photographing apparatus, the vehicle when the vehicle is located at the station;
specifies a vehicle type of the vehicle from an image photographed by the photographing apparatus; and
obtains, from the database, the coil position information associated with the vehicle type specified.

12. A wireless power transfer system that supplies electric power to a vehicle in which an electric power receiving coil capable of receiving wireless power transfer is incorporated, the wireless power transfer system comprising:
a station that the vehicle is capable of entering and leaving; and
a plurality of bottom part detection sensors having a detection unit capable of detecting an object that enters a detection range, and provided at the station and arranged to be spaced apart from each other so that the detection unit detects the vehicle from a front end to a rear end in a front-rear direction of the vehicle, each of the plurality of bottom part detection sensors being configured to output a bottom part detection signal corresponding to a portion, which enters the detection range, of a bottom part of the vehicle, wherein
the wireless power transfer system:
outputs, using the plurality of bottom part detection sensors, a respective plurality of the bottom part detection signals when the vehicle is located at the station; and
extracts, from a position dependence of the bottom part detection sensor of the respective plurality of bottom part detection signals, coil position information that is information about a position of the electric power receiving coil in the vehicle.

13. The wireless power transfer system according to claim 12, wherein
the plurality of bottom part detection sensors include an eddy current type distance sensor that outputs a bottom part detection signal corresponding to a separation distance between the portion which enters the detection range and the detection unit, and to a magnetic property of the portion which enters the detection range, and
the coil position information is further based on a portion inside a contour of the bottom part of the vehicle in which detection sensitivity that is an amount of change in the bottom part detection signal per unit distance significantly changes.

14. The wireless power transfer system according to claim 12, wherein
the plurality of bottom part detection sensors include a laser type distance sensor that outputs a bottom part detection signal corresponding to a separation distance between the portion which enters the detection range and the detection unit, and
the coil position information is further based on a portion inside a contour of the bottom part of the vehicle that matches a preset contour that is a contour preset in advance.

15. The wireless power transfer system according to claim 12, wherein
the plurality of bottom part detection sensors include a laser type distance sensor that outputs a bottom part detection signal corresponding to a separation distance between the portion which enters the detection range and the detection unit, and
the coil position information is further based on a portion inside a contour of the bottom part of the vehicle in which the bottom part detection signal does not change and is constant.

* * * * *